ATTITUDE COMPUTER WITH ROTATABLE REFERENCE FRAME

Inventors
GEORGES A. DESCHAMPS
MARTIN PRESS
By Percy P. Lantzy
Attorney

Inventors
GEORGES A. DESCHAMPS
MARTIN PRESS
By [signature]
Attorney

ATTITUDE COMPUTER WITH ROTATABLE REFERENCE FRAME

Filed March 19, 1959 15 Sheets-Sheet 3

Inventors
GEORGES A. DESCHAMPS
MARTIN PRESS
By [signature]
Attorney

ATTITUDE COMPUTER WITH ROTATABLE REFERENCE FRAME

Filed March 19, 1959 15 Sheets-Sheet 4

INVENTORS.
GEORGES A. DESCHAMPS
MARTIN PRESS
BY Percy P. Lantzy
ATTORNEY

ATTITUDE COMPUTER WITH ROTATABLE REFERENCE FRAME

INVENTORS.
GEORGES A. DESCHAMPS
MARTIN PRESS
BY [signature]
ATTORNEY

ATTITUDE COMPUTER WITH ROTATABLE REFERENCE FRAME

INVENTORS.
GEORGES A. DESCHAMPS
MARTIN PRESS
BY Percy P. Lantzy
ATTORNEY

ATTITUDE COMPUTER WITH ROTATABLE REFERENCE FRAME

Filed March 19, 1959 15 Sheets-Sheet 7

INVENTORS.
GEORGES A. DESCHAMPS
MARTIN PRESS
BY
ATTORNEY

ATTITUDE COMPUTER WITH ROTATABLE REFERENCE FRAME

INVENTORS.
GEORGES A. DESCHAMPS
MARTIN PRESS
BY Percy P. Lantzy
ATTORNEY

ATTITUDE COMPUTER WITH ROTATABLE REFERENCE FRAME

Filed March 19, 1959 15 Sheets-Sheet 9

Inventors
GEORGES A. DESCHAMPS
MARTIN PRESS
By [signature]
Attorney

Inventors
GEORGES A. DESCHAMPS
MARTIN PRESS
By [signature]
Attorney

ATTITUDE COMPUTER WITH ROTATABLE REFERENCE FRAME

Filed March 19, 1959 15 Sheets-Sheet 11

INVENTORS.
GEORGES A. DESCHAMPS
MARTIN PRESS
BY
ATTORNEY

INVENTORS.
GEORGES A. DESCHAMPS
MARTIN PRESS
BY Percy P. Lantzy
ATTORNEY

ATTITUDE COMPUTER WITH ROTATABLE REFERENCE FRAME

Filed March 19, 1959 15 Sheets-Sheet 13

INVENTORS.
GEORGES A. DESCHAMPS
MARTIN PRESS
BY [signature]
ATTORNEY

Inventors
GEORGES A. DESCHAMPS
MARTIN PRESS
By [signature]
Attorney

ATTITUDE COMPUTER WITH ROTATABLE REFERENCE FRAME

INVENTORS.
GEORGES A. DESCHAMPS
MARTIN PRESS
BY Percy P. Lantzy
ATTORNEY

United States Patent Office 3,258,226
Patented June 28, 1966

3,258,226
ATTITUDE COMPUTER WITH ROTATABLE REFERENCE FRAME

Georges A. Deschamps, Urbana, Ill., and Martin Press, Englewood, N.J., assignors to International Telephone and Telegraph Corporation, Nutley, N.J., a corporation of Maryland Filed Mar. 19, 1959, Ser. No. 800,428
11 Claims. (Cl. 244—14)

This invention relates to a system for rotating the three dimensional frames of reference in certain types of attitude computers for computing the attitude of a body with respect to a given frame of reference, and particularly to such computers using gyroscope sensors and serial-binary number storage means for storing numbers representative of the attitude of a body with respect to said rotated three-dimensional reference frame.

In the control and guidance of many bodies, such as aircraft, missiles, artificial satellites, etc., it is important to determine the attitude or orientation of the body with respect to a three-dimensional frame of reference, which may rotate. One use for such information is in enabling an aircraft or missile to maintain its proper orientation, either by pilot or human control or automatically. Another typical example of this is in inertial guidance systems wherein, to determine the velocity and position of the craft in a reference frame, translational accelerations must be resolved in accordance with the attitude of the craft within said frame.

In certain inertial guidance system for aircraft and missiles a gimbaled platform is employed on which accelerometers are mounted, the platform being maintained stable with respect to a reference frame. This reference frame may, for example, be directed toward a star or may be rotated so as to be at all times orientated as latitude, longitude and gravity. Despite rotations of the craft, the orientation of the platform in such inertial guidance systems is always kept fixed with respect to the reference frame, and the attitude of the craft may be determined by comparing its attitude with that of the stabilized platform. Other inertial guidance systems do not employ a gimbaled platform but rather continually compute the cosines of angles between each axis of a craft and the axes of the reference frame. These cosines describe the position of a stable platform relative to the axes of the craft and are employed to modify the output from accelerometers fixed to the craft and aligned with the axes of the craft. The modified accelerometer outputs are representative of the craft's accelerations in the direction of the axes of the reference frame. One example of such an inertial guidance system for computing these cosines rather than employing a stabilized platform is described in patent application Serial No. 736,439, filed May 14, 1958, by Georges A. Deschamps, now Patent No. 3,176,119. The system described in the G. Deschamps application is sometimes called a no-gimbal attitude computer, since it does not require a gimbaled platform.

For some applications of the no-gimbal attitude computer it is desired that the reference frame rotate in space. For example, as the craft navigates about the world globe, it may be desirable that the three reference frame axes be at all times maintained in the directions of north, east, and downward in the direction of gravity. If this is desired, it is necessary that the reference frame be rotated continually because of the earth's motion in space and the craft's motion relative to the earth.

Therefore, it is an object of the present invention to provide means for rotating the reference frame in a no-gimbal attitude computer.

It is another object of the present invention to provide an improved system for determining and producing signals representing the attitude of a craft with respect to a rotatable reference frame, particularly a three-dimensional frame.

Another object is to provide such as an improved system in which the gimbaled platform is dispensed with and in which information as to the attitude of the craft is stored in a suitable storage device, and this information is changed as the vehicle performs rotations within the reference frame and as the reference frame is rotated, so that the stored information continuously represents the attitude of the craft with respect to said rotated reference frame.

In accordance with a main feature of the present invention, there is provided a system producing information representing the attitude of a body with respect to a rotatable reference frame comprising means for sensing rotations of said body and computing and storing said information representative of the attitude of said body with respect to said reference frame, a source of signals representing rotations of said reference frame in space and means under control of said last-mentioned signals for altering certain of said information in proportion to other of said information.

In accordance with another more specific feature of the present invention, rotation sensing devices, such as gyros, are arranged with respect to the body, for example, by being mechanically fixed thereto, so that their rotation sensing axes are fixed with respect to the body of the vehicle whereby, as the vehicle rotates with respect to the reference frame, signals representing these rotations are produced, these signals being fed to a no-gimbal attitude computer which continually computes and stores numbers representing the cosines of angles formed by each of said rotation sensing axes with the axes of the reference frame, another source of signals representing rotations of the reference frame and the sign of such rotations controls gating devices which add or subtract weighted values of each of said numbers to predetermined others of said numbers as dictated by the sign of said signals representing reference frame rotations.

To restate the foregoing, two distinct operations are performed in accordance with the present invention:

(1) computing and storing numbers representing the attitude of a body (i.e., an aircraft or missile) with respect to a given reference frame, and
(2) changing, in response to command signals, the stored numbers to represent a change in attitude (rotation) of the reference frame.

The command signals of the second operation are generated independently of the first operation or of the particular attitude or change of attitude of the body with respect to the reference frame or independently of any information obtained from the rotation sensors used in the first operation. These command signals are determined by the original attitude of the reference frame with respect to the newly desired attitude of said reference frame. They are independently generated depending upon how it is desired to rotate the attitude of the reference frame. For example, command signals may be generated to cause a single shift in the attitude of a reference frame from one set of celestial coordinates to another in interspace travel, or they may be used to continuously rotate the reference frame where navigation with respect to the axes of a rotating body, such as a planet (the Earth), is being accomplished.

Other and further objects and features of the present invention will become apparent, and the foregoing will be better understood with reference to the following description of embodiments thereof, reference being had to the drawings, in which:

FIGS. 1 and 1*a* illustrate a spatial orientation of a body with respect to a reference frame and the orientation of gyro sensors in said body;

Figure 5A:
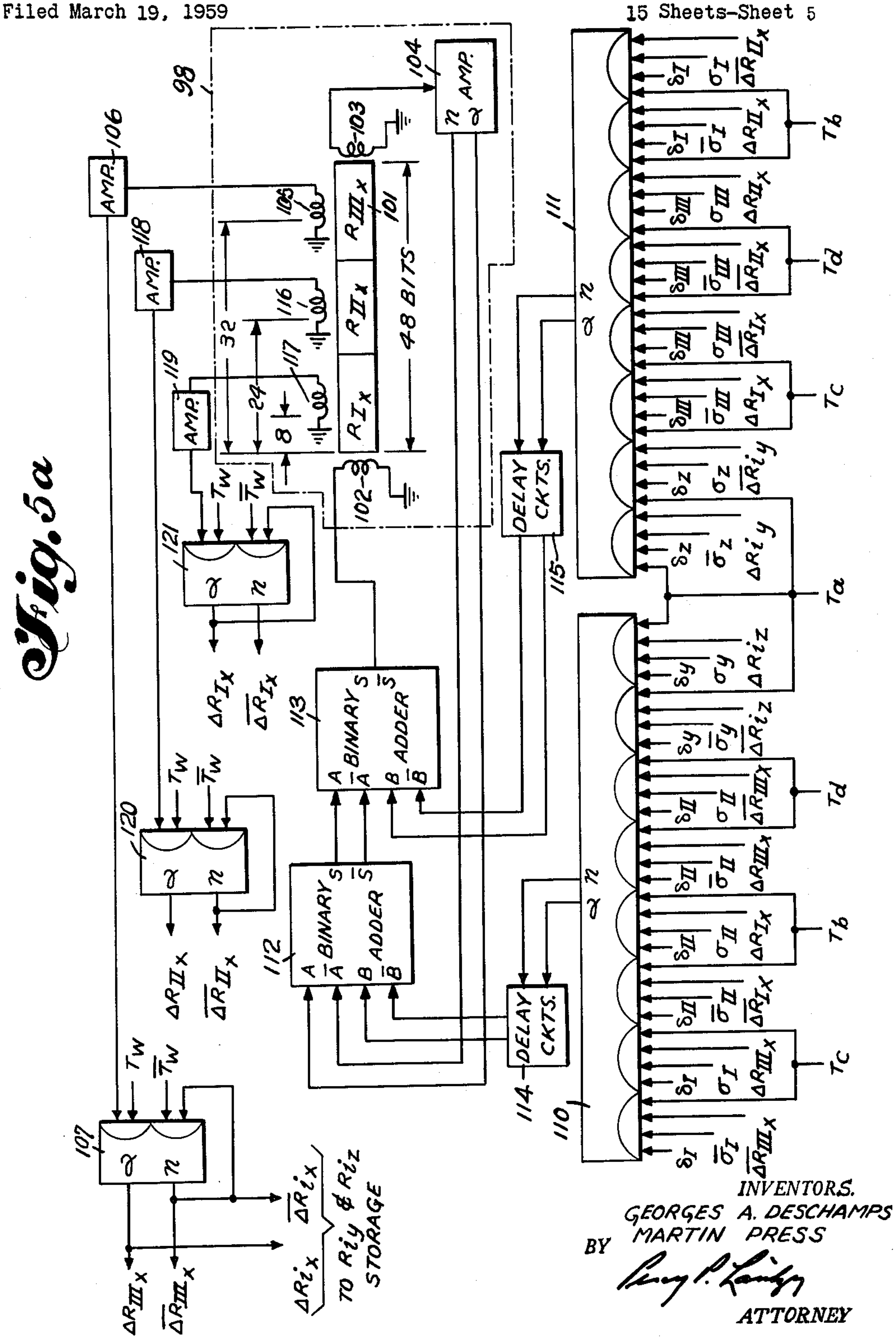
Figure 5B:
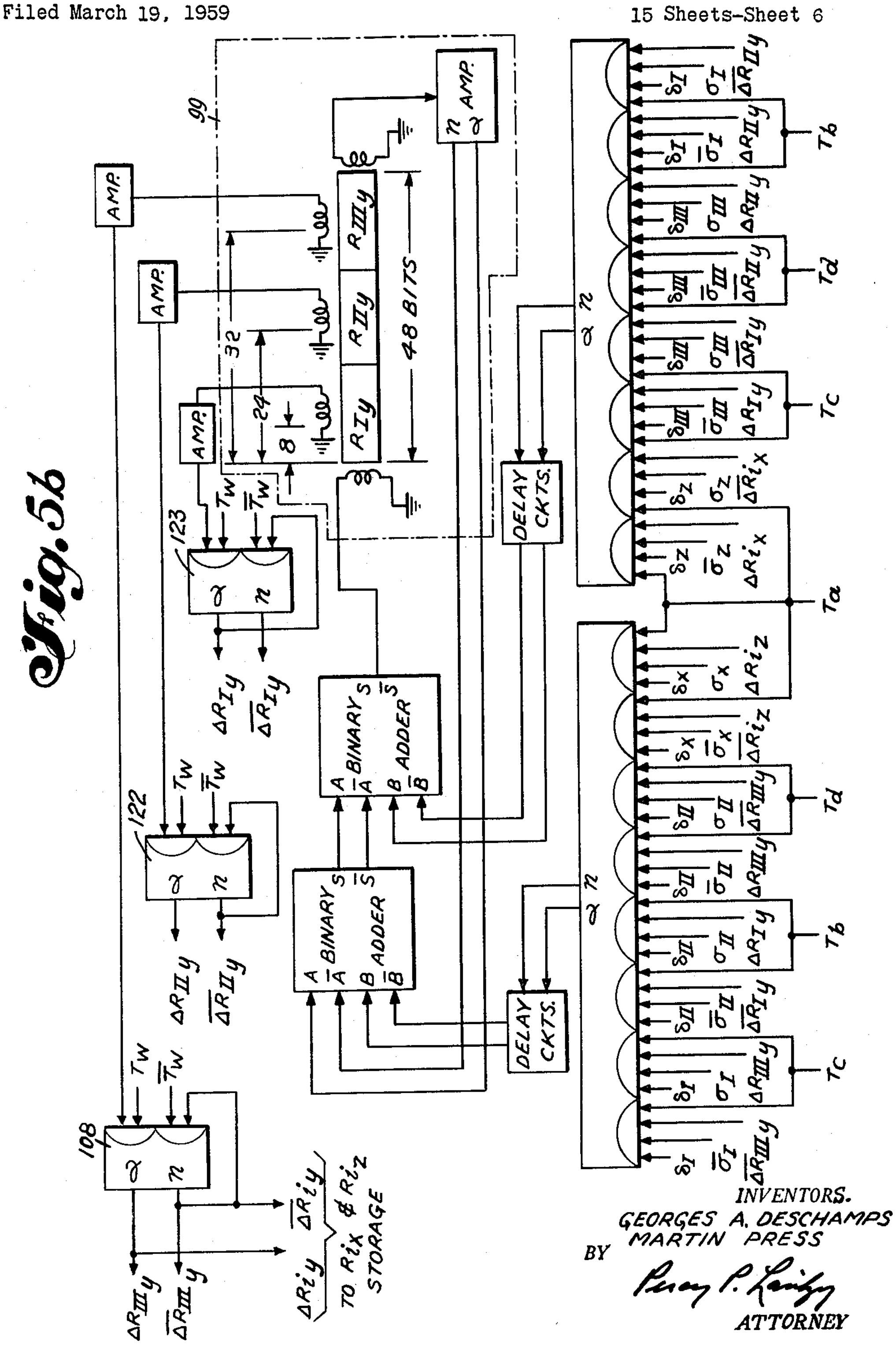
Figure 5C:
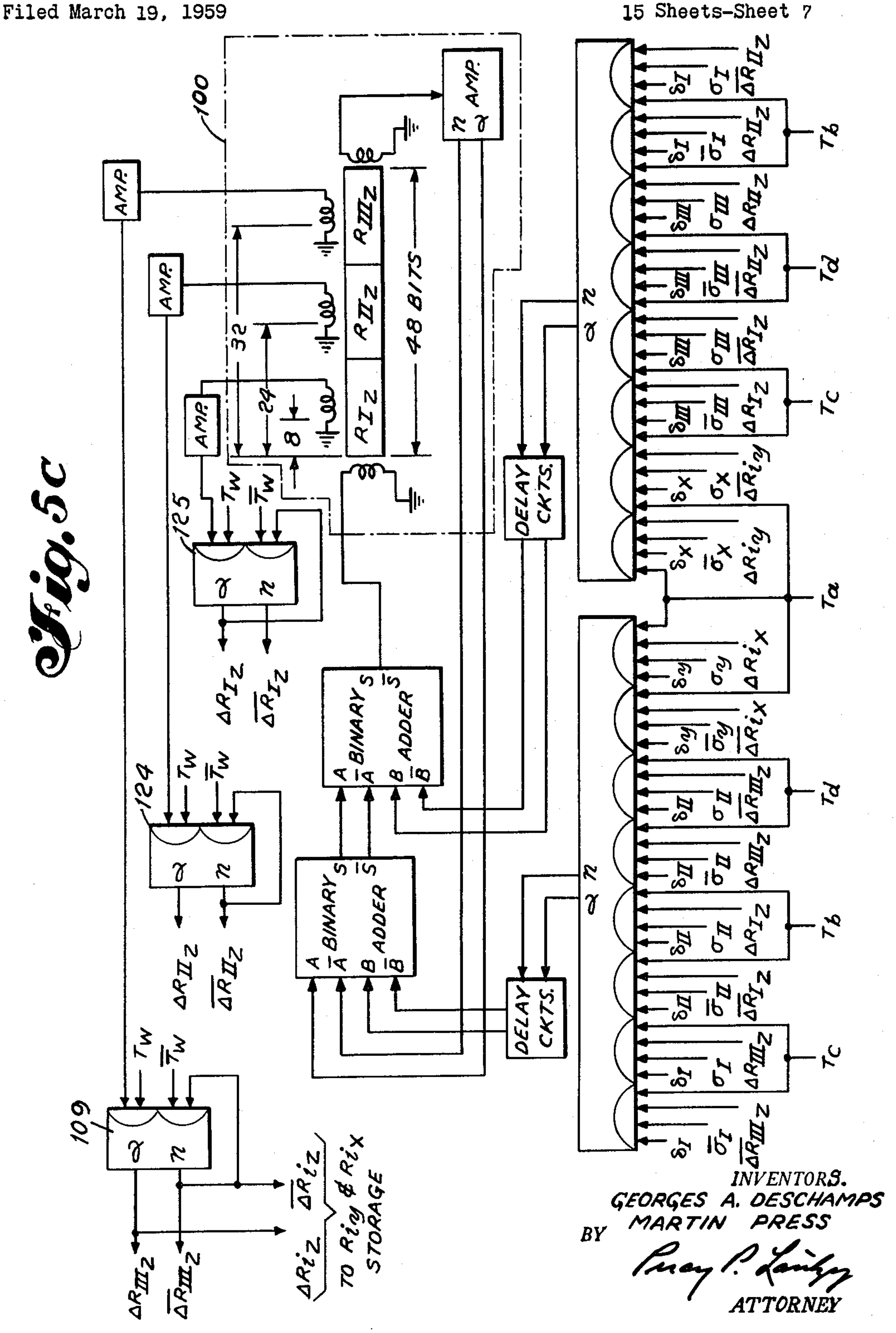
Figure 6B:
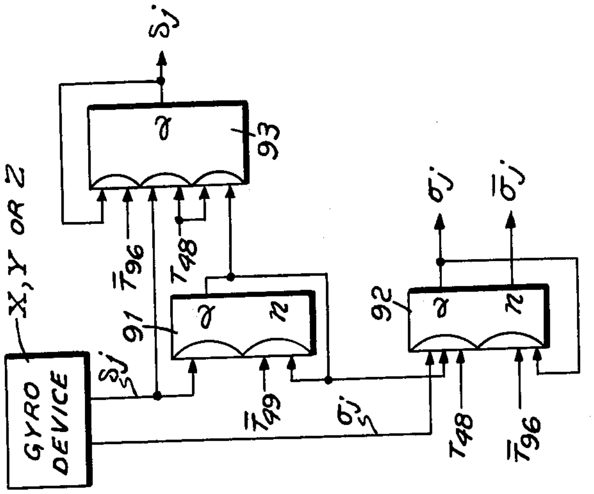
Figure 6A:
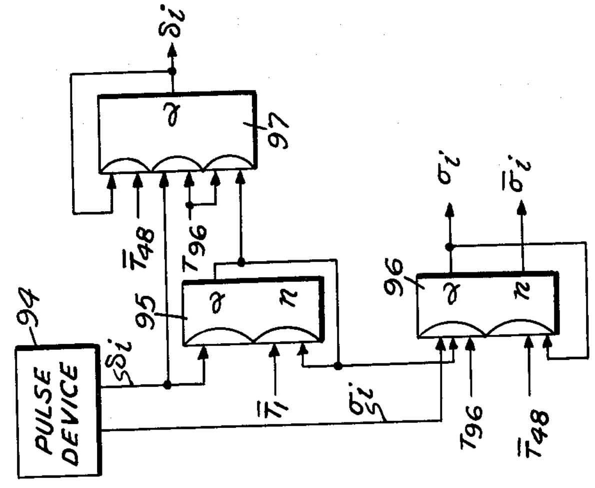
Figures 7A, 7B, 7C:
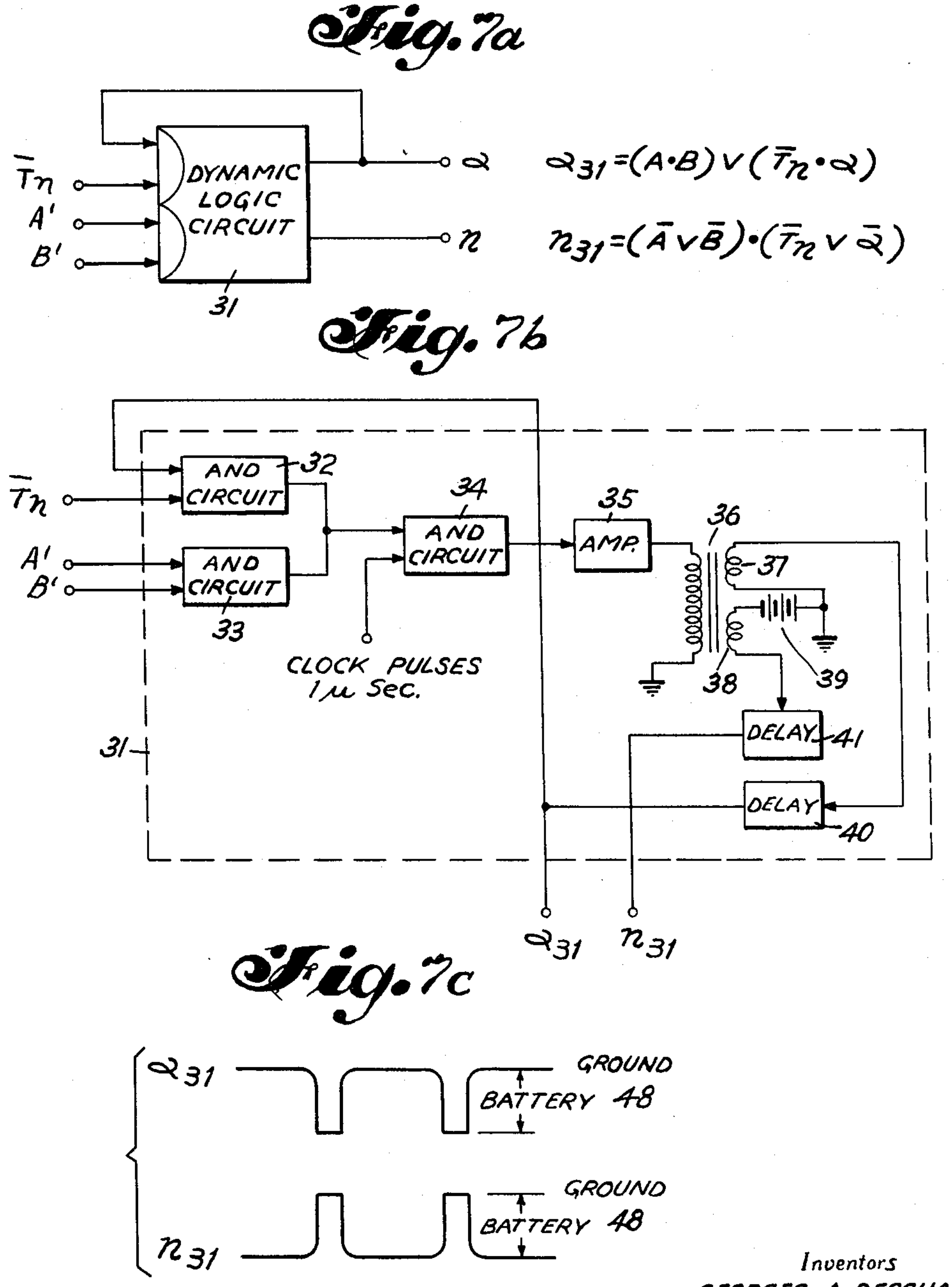
Figure 8:
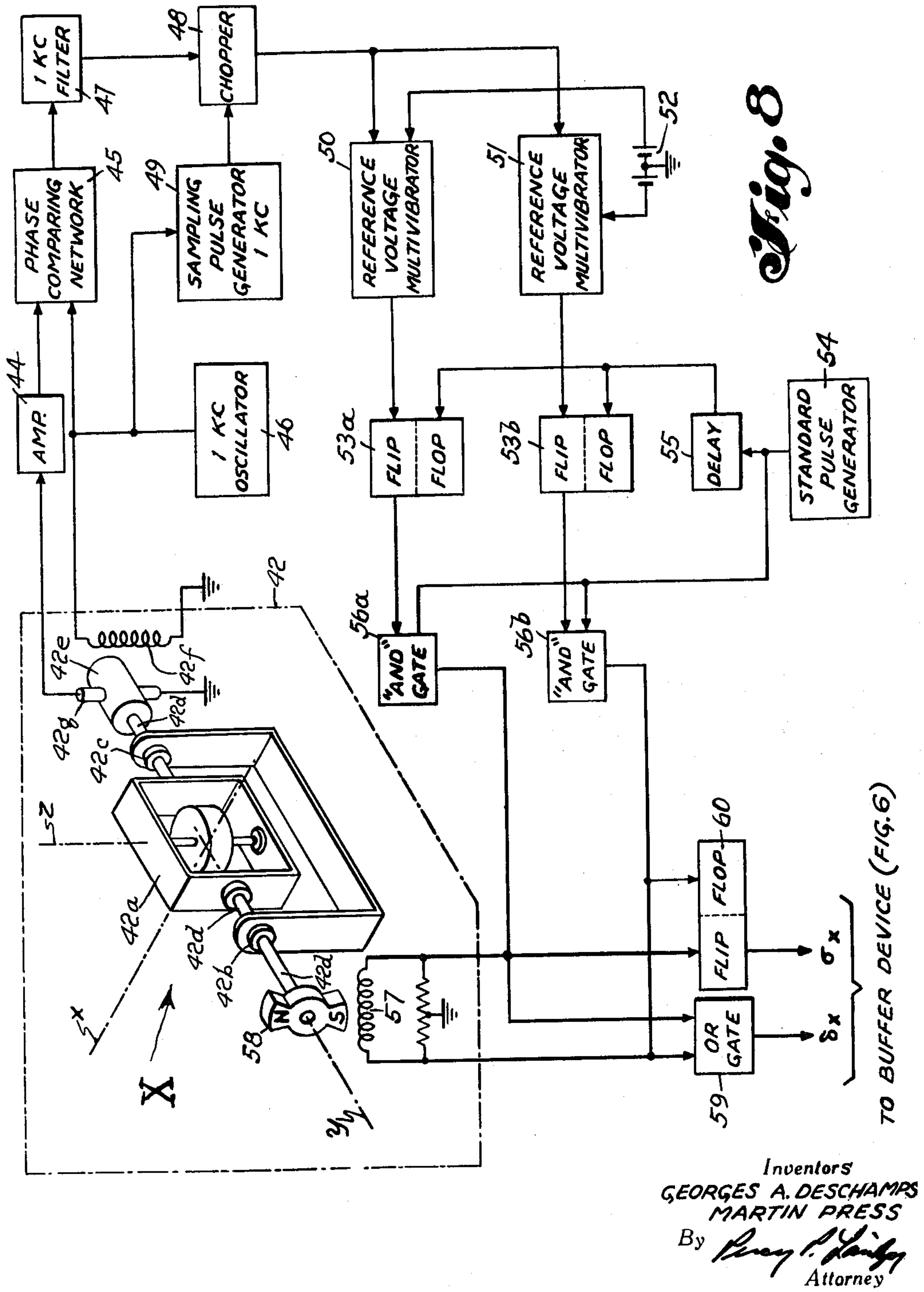
Figure 9:
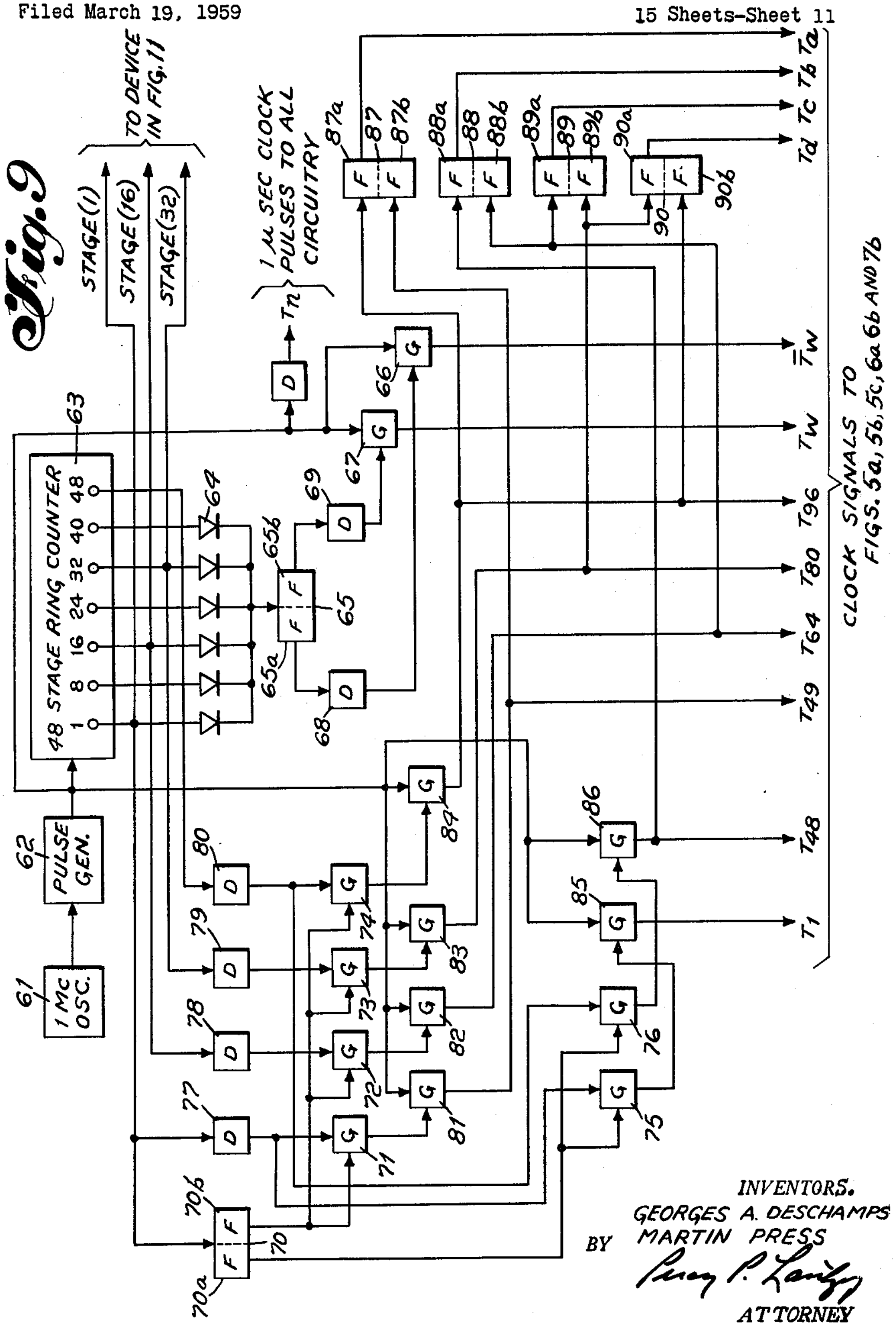
Figure 10A:
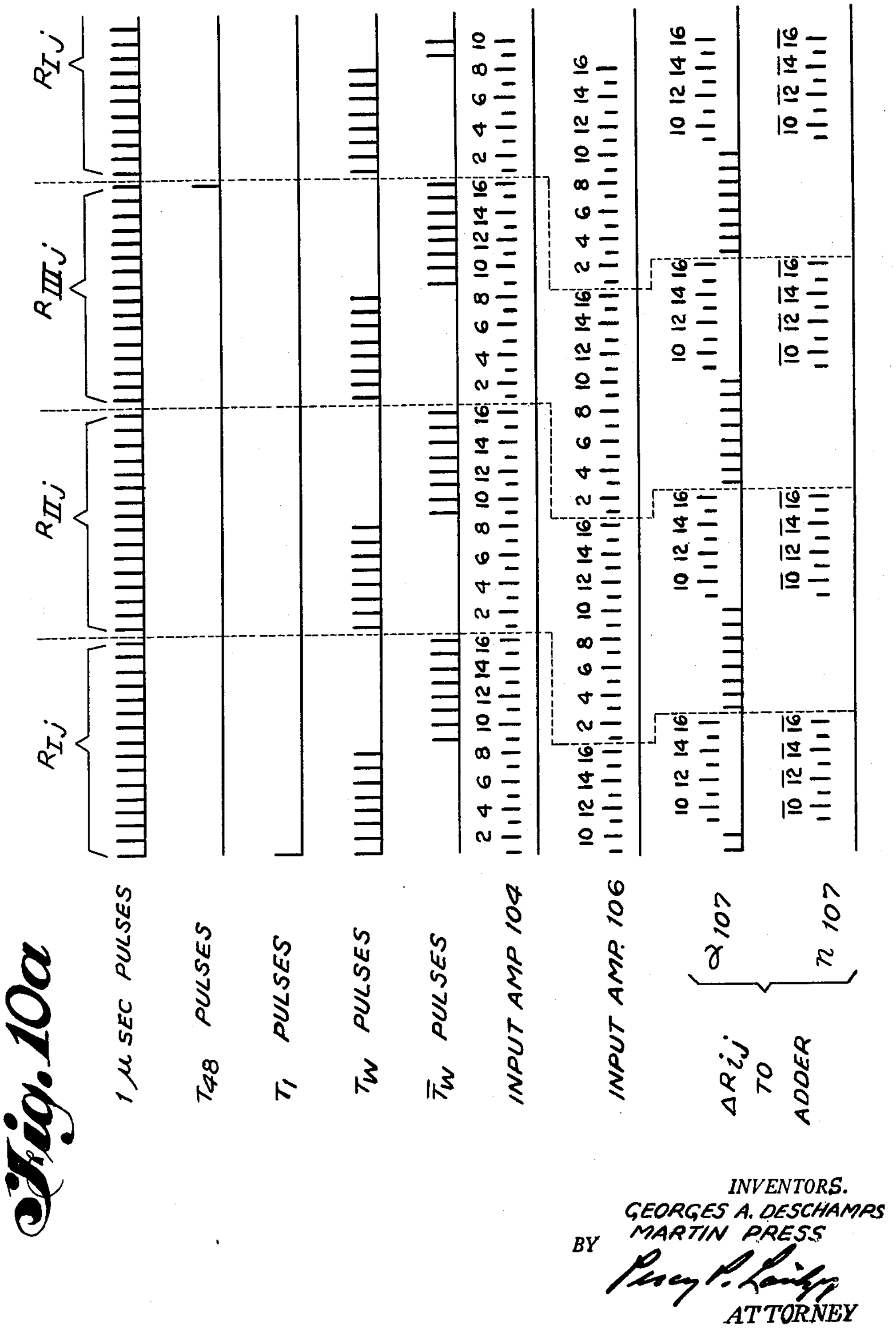
Figure 10B:
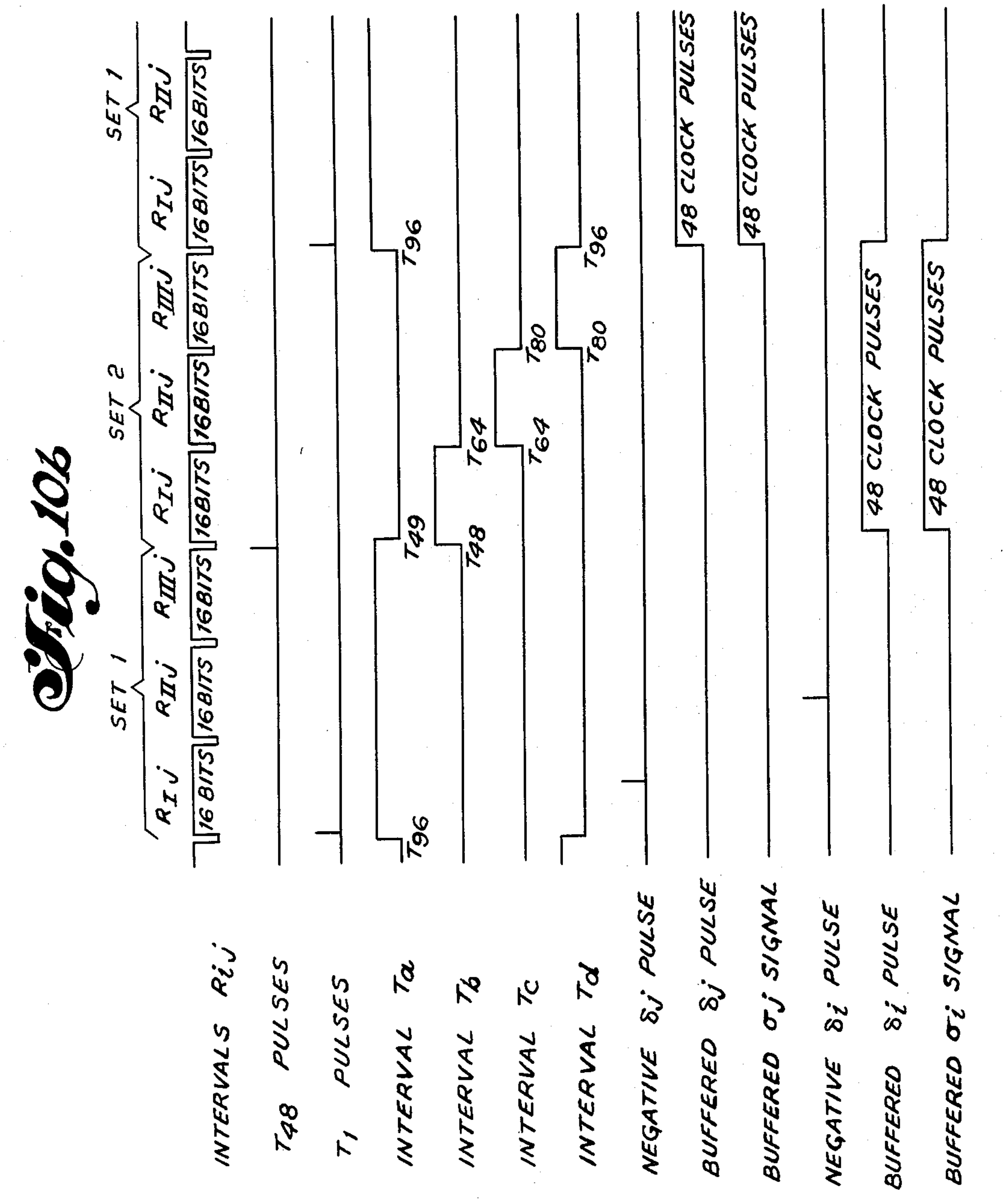
Figure 11:
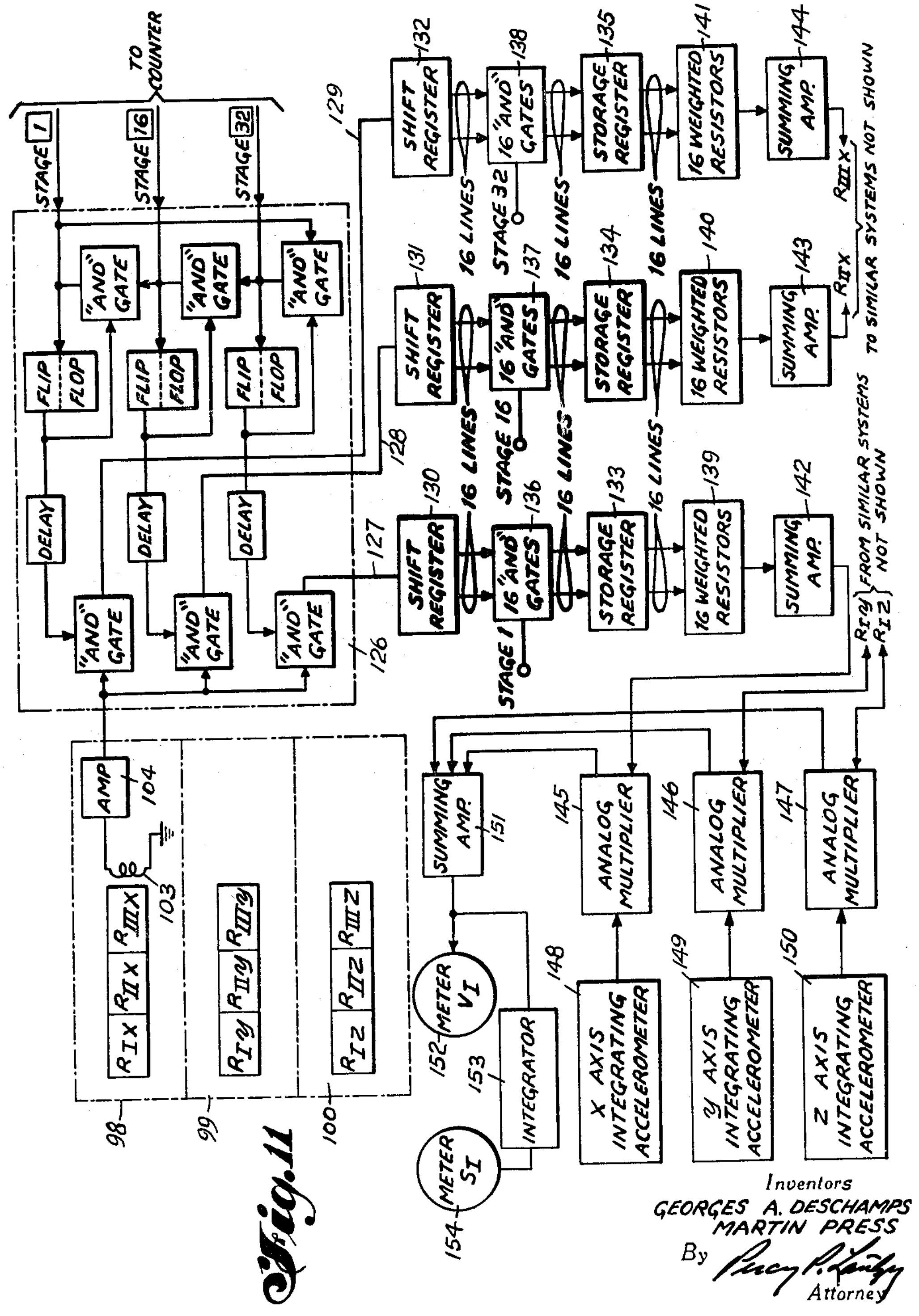
Figure 12:
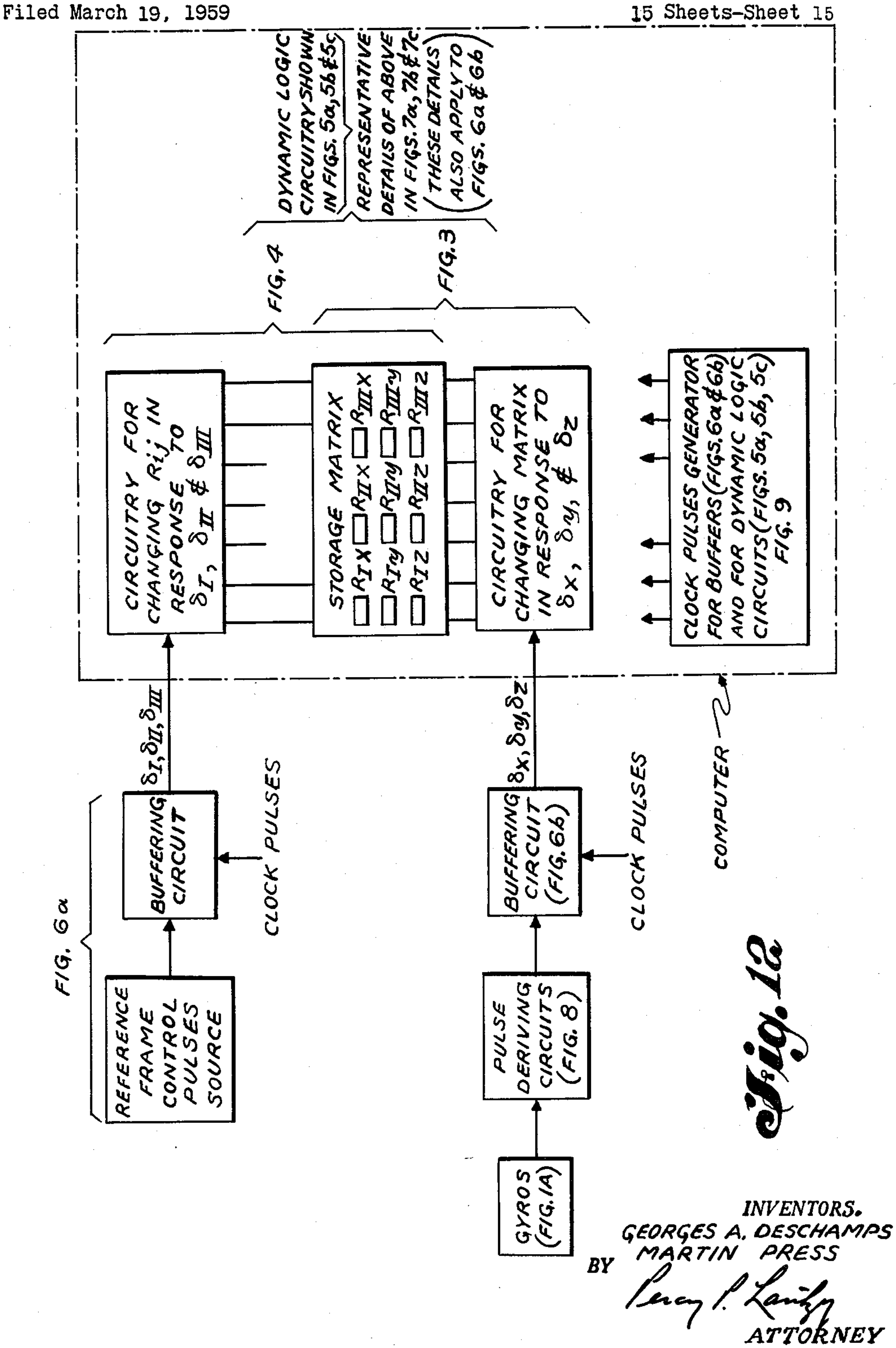

FIGS. 5*a*, 5*b* and 5*c* depict the matrix computer employing dynamic logic circuitry for computing nine numbers representing cosines in response to body rotation signals and reference frame rotation signals;

FIGS. 6*a* and 6*b* show buffer circuits employing dynamic logic circuitry for supplying control pulses representing increments of body rotation and other control pulses representing increments of reference frame rotation in response to the outputs of a typical gyroscope device and a typical source of reference frame rotation signals;

FIGS. 7*a*, 7*b* and 7*c* show diagrams and waveforms from which an understanding of the operation of a typical dynamic logic circuit may be had;

FIG. 8 shows a partially pictorial view and block diagram of a gyroscope device for providing pulse signals each indicative of a given angle of rotation and a signal indicative of the direction of said rotation;

FIG. 9 is a block diagram of the electronic clock for providing numerous clock pulses;

FIGS. 10*a* and 10*b* are waveform diagrams showing clock pulses and others employed in the matrix computer;

FIG. 11 is a block diagram of a utilization device for determining the position as well as attitude of a craft in a rotatable reference frame employing outputs from said matrix computer; and FIG. 12 is an assembly drawing of the matrix computer showing the relation of the various parts of the equipment (designating these parts by the number of the figure in which they appear) to each other. Reference to this figure will enable the ensuing discussion to be more easily followed.

Figures 1, 1A:
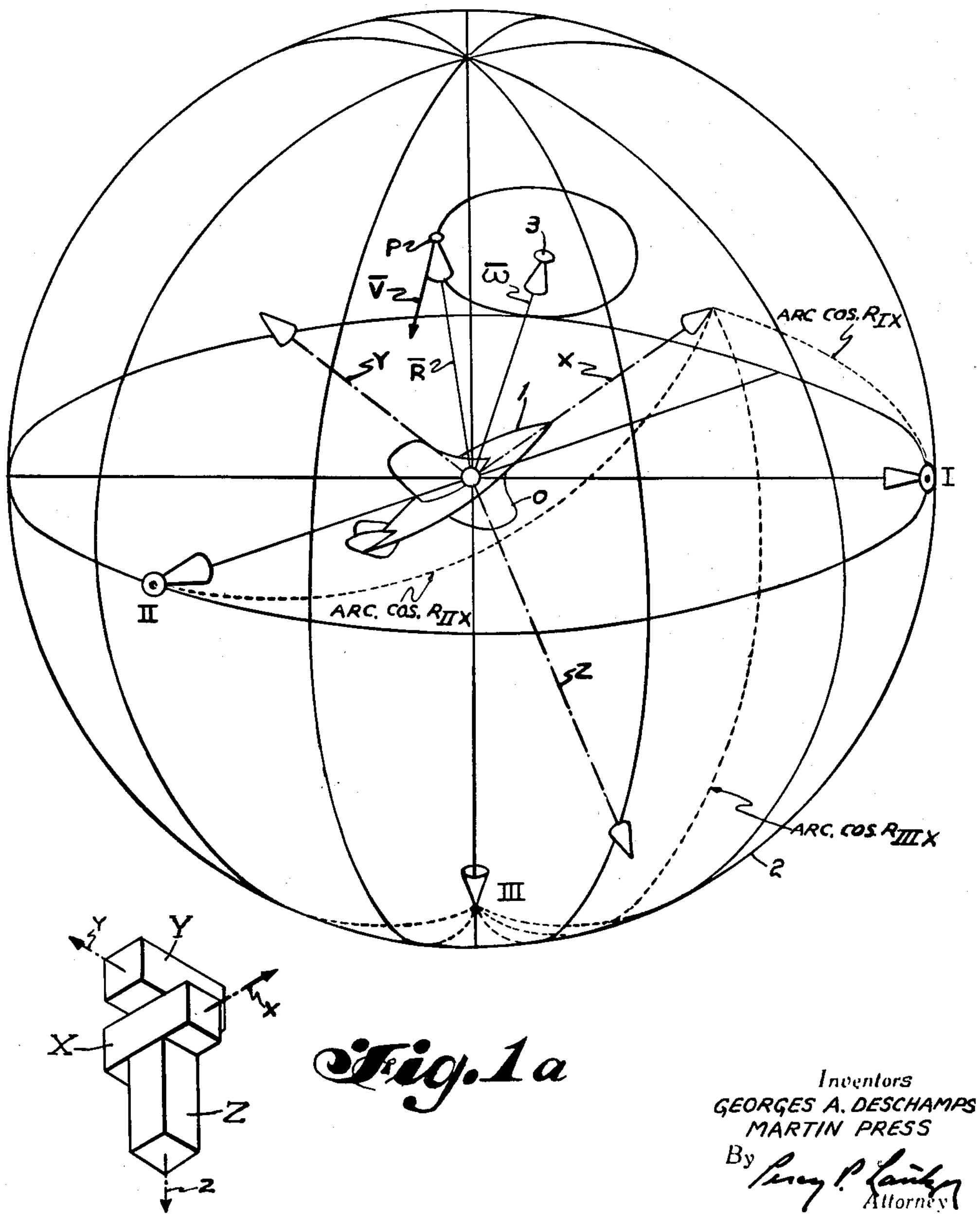

Turning first to FIG. 1, there is shown a spatial diagram from which an understanding of the theory of the no-gimbal attitude computer may be had. A similar no-gimbal attitude computer is described in the reference Deschamps patent application. A body, such as a missile or an aircraft, 1 is shown having axes $x$, $y$ and $z$ rigidly fixed thereto and extending from the origin 0 of sphere 2, which is preferably the center of gravity of the body 1, to the surface of sphere 2. Assume that body 1 rotates in three-dimensional space at an angular rate $\omega$ having components in the $x$, $y$, and $z$ directions of $\omega_x$, $\omega_y$ and $\omega_z$. Furthermore, let the angular rate $\omega$ be represented by a vector $\bar{\omega}$ extending from the origin of sphere 2, its line of direction intercepting the surface of sphere 2 at point 3 which is the center of a circle drawn on the surface of sphere 2 and passing through some point P whose location on the surface of sphere 2 relative to the origin 0, may be represented by unit vector $\bar{R}$. Obviously, the instantaneous translational velocity of point P on the surface of sphere 2 may be represented by the vector cross product $\bar{\omega}\times\bar{R}$ as follows:

$$\text{(A)}\qquad \bar{V}=\omega\times\bar{R}$$

Since $\bar{\omega}$ may be represented by its components in the directions $x$, $y$, and $z$, namely, $\omega_x$, $\omega_y$ and $\omega_z$, and since $\bar{R}$ may be represented by its components in the directions $x$, $y$, and $z$, namely $R_x$, $R_y$ and $R_z$, the vector cross product may be written as follows:

$$\text{(B)}\qquad \bar{V}=(\omega_yR_z-\omega_zR_y)i+(\omega_zR_x-\omega_xR_x)j+(\omega_xR_y-\omega_yR_x)k$$

In matrix notation the above expanded cross product may be represented by a matrix multiplication as follows:

$$\begin{bmatrix} V_x \\ V_y \\ V_z \end{bmatrix}=\begin{bmatrix} 0 & -\omega_z & \omega_y \\ \omega_z & 0 & -\omega_x \\ -\omega_y & \omega_x & 0 \end{bmatrix}\begin{bmatrix} R_x \\ R_y \\ R_z \end{bmatrix}\qquad \text{(C)}$$

and the rotation rate matrix may be simplified for expression by the following identity:

$$[\omega]=\begin{bmatrix} 0 & -\omega_z & \omega_y \\ \omega_z & 0 & -\omega_x \\ -\omega_y & \omega_x & 0 \end{bmatrix}\qquad \text{(D)}$$

Referring again to FIG. 1, we will now express the velocity of point P in terms of components along axes I, II, and III of a reference or inertial frame of reference which may be rotated in space for any desired reason. However, for the moment consider this reference frame fixed in space. Rotational vector $\bar{\omega}$ can be expressed in terms of rotational components about axes I, II, III and vector $\bar{R}$ can be expressed in terms of its projections along axes I, II, and III to yield a matrix equation for the velocity of point P in terms of its components in the directions of axes I, II, and III, denoted $V_I$, $V_{II}$ and $V_{III}$ having the same form as the matrix equation above. However, this obvious method for obtaining the velocity of point P in terms of components along axes I, II, and III will not be employed in this invention, but rather, another method will be employed whereby the matrix $[\omega]$ expressing the rotational rate of point P about axes $x$, $y$ and $z$ will be retained. This other method is necessary because in practice the rotation rates $\omega_x$, $\omega_y$ and $\omega_z$ are readily available as the outputs from gyroscope devices fixed to the body 1 and orientated along the lines of axes $x$, $y$, and $z$ of body 1, as shown in FIG. 1*a*. In order to employ the $[\omega]$ matrix, each of the components $R_x$, $R_y$ and $R_z$ must be expressed in terms of their projections on axes I, II and III to yield the following matrix equation expressing the projections of each of the velocity vectors $V_x$, $V_y$ and $V_z$ on the axes I, II and III:

$$\begin{bmatrix} V_{Ix} & V_{IIx} & V_{IIIx} \\ V_{Iy} & V_{IIy} & V_{IIIy} \\ V_{Iz} & V_{IIz} & V_{IIIz} \end{bmatrix}=[\omega]\begin{bmatrix} R_{Ix} & R_{IIx} & R_{IIIx} \\ R_{Iy} & R_{IIy} & R_{IIIy} \\ R_{Iz} & R_{IIz} & R_{IIIz} \end{bmatrix}\qquad \text{(E)}$$

The above matrix equation may be written in another algorithm form for convenience of discussion as follows:

$$\text{(F)}\qquad V=dR/dt=[\omega]R$$

The above algorithm form of the matrix equation may be put in increment form by rewriting it as the following approximation:

$$\text{(G)}\qquad \Delta R/\Delta t=[\omega]R$$

and since $[\omega]\Delta t$ is equivalent to $[\delta]$ which is the matrix form representing an increment of angle made by the path of point P on the surface of sphere 2 as subtended from the origin 0 during the interval $\Delta t$, the above may be expressed as follows:

$$\text{(H)}\qquad \Delta R=[\delta]R$$

Since the matrix $[\delta]$ may be taken similar to the matrix $[\omega]$ to a first approximation it follows:

$$[\delta]=\begin{bmatrix} 0 & -\delta_z & \delta_y \\ \delta_z & 0 & -\delta_z \\ -\delta_y & \delta_x & 0 \end{bmatrix}$$

Another more accurate version of the $[\delta]$ matrix which reduces truncation error is as follows:

$$[\delta]=\begin{bmatrix} \frac{-\delta_x^2}{2} & \delta_z & -\delta_y \\ -\delta_z & \frac{-\delta_y^2}{2} & \delta_x \\ \delta_y & -\delta_x & \frac{-\delta_z^2}{2} \end{bmatrix}$$

The truncation error exists because the interval $\Delta t$ is finite and during that interval a rotation of body 1 about, say for example the $x$ axis, will cause a third order change in the value of the projection of the vector R on the $x$ axis, denoted herein as $R_x$, and, thus, a third order change in the value of the projection of $R_x$ on the reference axes I, II and III, denoted herein as $R_{Ix}$, $R_{IIx}$ and $R_{IIIx}$, respectively. Obviously, even more accurate matrices for [δ] could be employed in place of the approximate matrix shown in Equation I or in place of the third order correction matrix shown directly above, however, in order to simplify the embodiment of this invention herein described, which is adequate for most applications, use of the simpler matrix shown in Equation I will be disclosed in detail.

Referring again to Equation H, an algorithm equation for ΔR may be written in matrix form as follows:

$$\begin{bmatrix} \Delta R_{Ix} & \Delta R_{IIx} & \Delta R_{IIIx} \\ \Delta R_{Iy} & \Delta R_{IIy} & \Delta R_{IIIy} \\ \Delta R_{Iz} & \Delta R_{IIz} & \Delta R_{IIIz} \end{bmatrix} = \begin{bmatrix} 0 & -\delta_z & \delta_y \\ \delta_z & 0 & -\delta_x \\ -\delta_y & \delta_x & 0 \end{bmatrix} \begin{bmatrix} R_{Ix} & R_{IIx} & R_{IIIx} \\ R_{Iy} & R_{IIy} & R_{IIIy} \\ R_{Iz} & R_{IIz} & R_{IIIz} \end{bmatrix}$$

Next, performing the matrix multiplication on the right-hand side of the above matrix equation, the following nine simultaneous equations, one for each ΔR, are obtained:

(K)

$$\Delta R_{Ix}=0-\delta_z.R_{Iy}+\delta_y.R_{Iz}$$
$$\Delta R_{IIx}=0-\delta_z.R_{IIy}+\delta_y.R_{IIz}$$
$$\Delta R_{IIIx}=0-\delta_z.R_{IIIy}+\delta_y.R_{IIIz}$$
$$\Delta R_{Iy}=\delta_z.R_{Ix}+0-\delta_x.R_{Iz}$$
$$\Delta R_{IIy}=\delta_z.R_{IIx}+0-\delta_x.R_{IIz}$$
$$\Delta R_{IIIy}=\delta_z.R_{IIIx}+0-\delta_x.R_{IIIz}$$
$$\Delta R_{Iz}=-\delta_y.R_{Ix}+\delta_x.R_{Iy}+0$$
$$\Delta R_{IIz}=-\delta_y.R_{IIx}+\delta_x.R_{IIy}+0$$
$$\Delta R_{IIIz}=-\delta_y.R_{IIIx}+\delta_x.R_{IIIy}+0$$

if each value of R at an instant of time $t$ may be expressed by matrix $(R)_t$, then matrix $(R)_{t+1}$ is expressed as follows:

(L) $$(R)_{t+1}=(R)_t+(\Delta R)_t$$

Each value of R at the time $t+1$, denoted generally at $(R_{ij})_{t+}1$, may be expressed by one of the following nine simultaneous equations:

(M)

$$(R_{Ix})_{t+1}=(R_{Ix})_t+(\Delta R_{Ix})_t$$
$$(R_{IIx})_{t+1}=(R_{IIx})_t+(\Delta R_{IIx})_t$$
$$(R_{IIIx})_{t+1}=(R_{IIIx})_t+(\Delta R_{IIIx})_t$$
$$(R_{Iy})_{t+1}=(R_{Iy})_t+(\Delta R_{Iy})_t$$
$$(R_{IIy})_{t+1}=(R_{IIy})_t+(\Delta R_{IIy})_t$$
$$(R_{IIIy})_{t+1}=(R_{IIIy})_t+(\Delta R_{IIIy})_t$$
$$(R_{Iz})_{t+1}=(R_{Iz})_t+(\Delta R_{Iz})_t$$
$$(R_{IIz})_{t+1}=(R_{IIz})_t+(\Delta R_{IIz})_t$$
$$(R_{IIIz})_{t+1}=(R_{IIIz})_t+(\Delta R_{IIIz})_t$$

In a no-gimbal attitude computer of the type herein described, the typical coefficients $R_{ij}$ expressed in Equation M may be represented as binary numbers in a computer. Thus, nine such numbers will be represented in the computer in binary form and gyroscope signals $\delta_x$, $\delta_y$ and $\delta_z$ will represent equal increments of angles of rotation of body 1 about its axes $x$, $y$, and $z$ (see FIG. 1). These increments are chosen to be a power of 2 so that multiplication of $R_{ij}$ by $\delta_x$, $\delta_y$ or $\delta_z$, shown in Equations K, becomes a shifting process to shift each value of $R_{ij}$ a number of places determined by said power when multiplied by a δ pulse from a gyroscope. For example, a single $\delta_j$ pulse from a gyroscope may be chosen to indicate a rotational angle of $2^{-6}$ radians. Obviously, system accuracy could be improved by decreasing the angle represented by a single $\delta_j$ pulse from a gyroscope; for example, each pulse might represent a rotation of body 1 about one of its axes of $2^{-13}$ radians.

Figure 2:
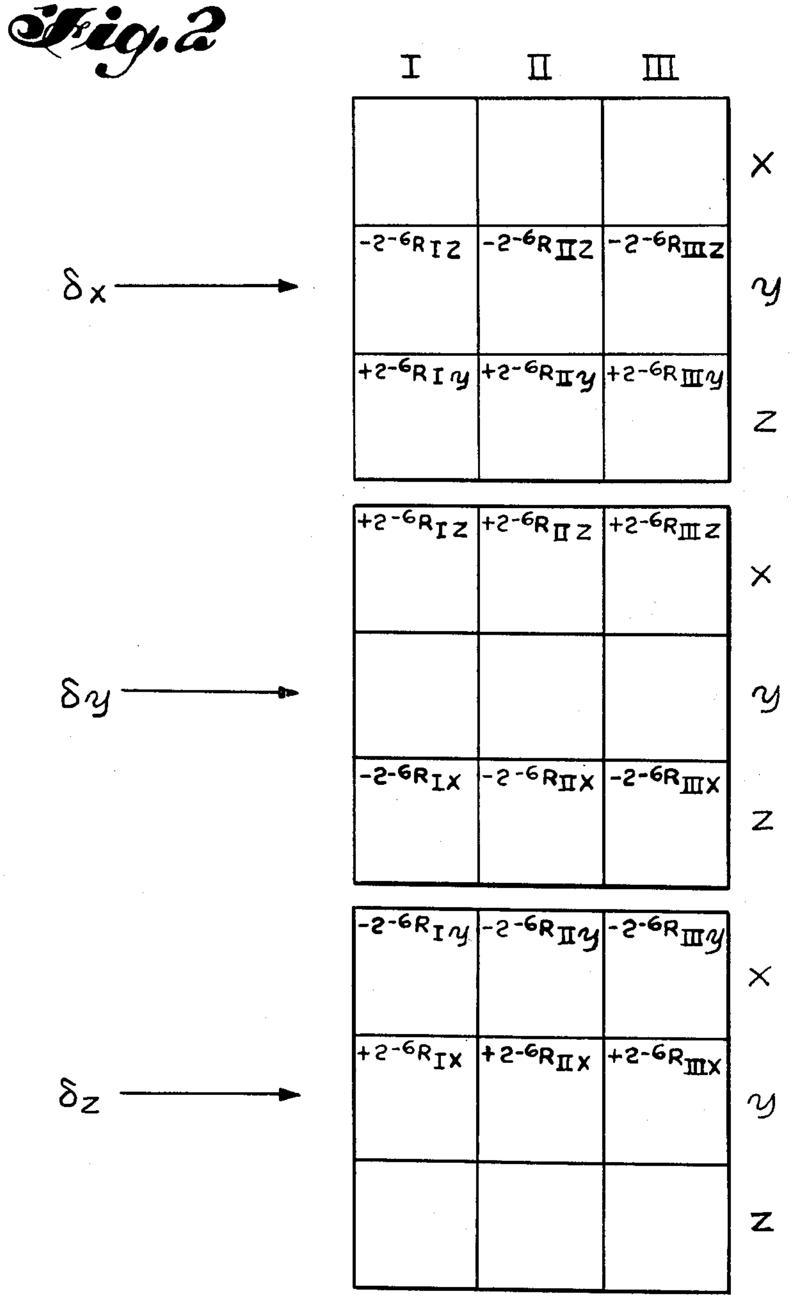
FIG. 2 is a chart showing the interrelationship between stored numbers as controlled by gyro signals.

The effect of a $\delta_j$ pulse representing an increment of rotation of the $x$, $y$, or $z$ axes upon the nine coefficients $R_{ij}$ expressed in Equations M is charted in FIG. 2. It will be seen from the chart that a $\delta_x$ pulse will produce no change in the $R_{Ix}$, $R_{IIx}$, $R_{IIIx}$ coefficients. It will further be seen that for the $R_{Iy}$ coefficient, there is a subtraction therefrom of a weighted portion of the value of the $R_{Iz}$ coefficient. The same pulse will cause an addition to the $R_{Iz}$ coefficient equal to the same fraction of the $R_{Iy}$. Further inspection of the chart in FIG. 2 will show that for the same $\delta_x$ pulse, there is a similar subtraction from the $R_{IIy}$ and $R_{IIIy}$ coefficients and a similar addition to the $R_{IIz}$ and $R_{IIIz}$ coefficients. For a $\delta_y$ pulse, representing an increment of rotation around the $y$ axes, there is a similar process of addition and subtraction occurring between the $R_{ix}$ coefficients and the $R_{iz}$ coefficients and for a $\delta_z$ pulse, there is a similar subtraction and addition between the $R_{ix}$ and $R_{iy}$ coefficients as likewise shown in the chart.

In the above chart, it is presupposed that the increments of rotation, that is, the $\delta_x$, $\delta_y$ and $\delta_z$ are positive. If they are negative, the signs inside the boxes are reversed. After the computer for carrying out the functions indicated in the chart, FIG. 2, has been initially aligned with respect to any arbitrary reference frame axes I, II, and III, the successive $\delta_j$ pulses will change to the $R_{ij}$ coefficients in the computer in accordance with the rotation of the $x$, $y$ and $z$ axes so that the nine coefficients will continuously represent the attitude of the $x$, $y$ and $z$ axes with respect to the reference frame axes I, II and III (see FIG. 1).

Figure 3:
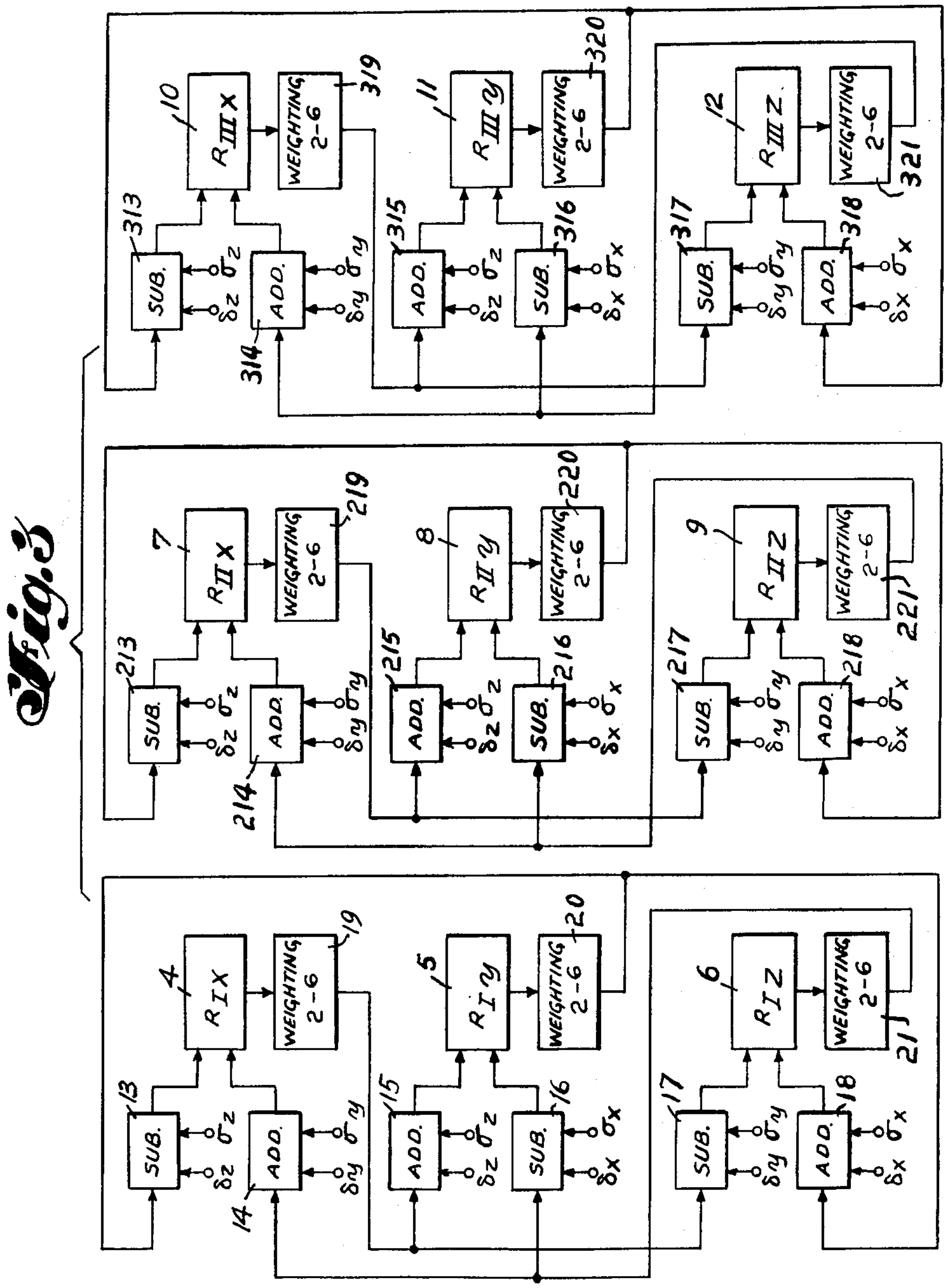
FIG. 3 is a block diagram showing the general method of computing and storing said numbers in response to gyro signals.

Generally, the no-gimbal attitude computer will perform the operations of FIG. 2 by apparatus which performs the functions indicated in FIG. 3. Referring now to FIG. 3, each one of the $R_{ij}$ coefficients, representing nine numbers, may be stored numbers in a separate register designated as 4 to 12, respectively. These may be in binary form and the registers may be, for example, either magnetic drums, pulse recirculating storage registers, etc. Since the circuitry connecting registers 4, 5 6 is the same as that connecting 7, 8 and 9, or 10, 11, and 12, a brief description of the circuitry connecting registers 4, 5 and 6 will suffice. When a $\delta_j$ pulse arrives accompanied by its associated $\sigma_j$ signal which indicates the sign of the $\delta_j$ pulse, and said $\sigma_j$ signal indicates positive, there is an addition made to one of the registers and a subtraction from another of the registers. This addition and subtraction may of course be reversed if said $\sigma_j$ signal indicates negative. Such additions and subtractions to the number in each register 4, 5 and 6 are made by devices 13 to 18, each of which is designated "subtract" or "add" to indicate its function in response to the $\delta_j$ pulse controlling it, when that $\delta_j$ pulse is positive as indicated by its associated $\sigma_j$ signal. The inputs to devices 13 to 18, which are indicative of the numbers to be added or subtracted to registers 4, 5 or 6, are obtained from weighting devices 19, 20 and 21 coupled to registers 4, 5 and 6, respectively. The function of each of these weighting devices is to read the number in the register to which it is coupled without altering said number and to weight the read number by effectively multiplying it by a factor equivalent to the value of a single $\delta_j$ pulse. For example, if each $\delta_j$ pulse represents a rotation of body 1 about one of its axes of $2^{-6}$ radians and the numbers in registers 4 to 12 are represented in binary form by 16 binary bits, the action of each weighting devices 19, 20 and 21 is to alter the significance of each binary bit by reducing its significance six binary places. In other words, a number in a register represented in binary notation, least significant bit first, as 1010110010110011 would be weighted as 0010110011.

With the above being understood, it can readily be seen how the system of FIG. 3 operates in accordance with the chart of FIG. 2 when a $\delta_j$ pulse is received. Assuming for the moment that a positive $\delta_x$ pulse is received, this will actuate the "subtract" device 16 and the "add" device 18 feeding registers 5 and 6. A weighted portion of the coefficients $R_{Iz}$ in register 6 will be subtracted from the coefficient $R_{Iy}$ in register 5 while at the same time, the same $\delta_x$ pulse will actuate device 18 causing a weighted portion of $R_{Iy}$ in register 5 to be added to the coefficient $R_{Iz}$ in register 6. It will be seen that this corresponds to the operations indicated by the chart in FIG. 2. The same actions, in response to a $\delta_x$ pulse, will occur between registers 8 and 9 and 11 and 12, thereby changing the value of their corresponding coefficients. For a $\delta_y$ pulse, the "add" and "subtract" devices 14 and 17 will operate in accordance with the indication of FIG. 2, and for a $\delta_z$ pulse, devices 13 and 15 will operate in accordance with the corresponding indications of FIG. 2. The additions and subtractions produced by the $\delta_j$ pulses in registers 4, 5 and 6, as hereinabove described, will also occur in registers 7 through 12 in a similar manner as indicated in the chart of FIG. 2. Therefore, assuming that the registers are initially aligned so that the $R_{ij}$ coefficients properly represent the orientation of the *x, y* and *z* axes, with respect to the reference frame, thereafter, as rotations of the body about axes *x, y, z* occur, the registers will change as heretofore indicated and continue to show the orientation of the *x, y* and *z* axes with respect to the reference frame.

In certain applications it is desired to rotate the reference frame axis I, II and III and to alter the coefficient $R_{ij}$ so that they at all times represent the angles between body axes and the reference frame axis. The present invention teaches a method of accomplishing this. For an understanding of the principle of the operation of the invention, reference is first made to FIG. 1 and Equations K. As previously described, Equations K represent changes in each of the coefficients $R_{ij}$ as functions of increments of rotation of body 1 about its axis *x, y* and *z*. Furthermore, these Equations K are developed upon the presumption that the reference frame axes I, II and III remain rotationally fixed in space. On the other hand, if it is assumed that body 1 remains rotationally fixed in space, then similar expressions for changes in the coefficient $R_{ij}$ can be formed as functions of increments of rotation of the reference frame about its axes I, II and III. For example, if body axes *x, y* and *z* are assumed to be rotationally fixed in space and it is desired to rotate the reference frame about its axis I, II and III by rotational increments $\delta_I$, $\delta_{II}$, $\delta_{III}$, respectively, it is apparent (by the same reasoning employed to form Equations K) that the coefficients $R_{Ix}$ will be altered by an amount $\Delta R'_{Ix}$ expressed as follows:

$$\Delta R'_{Ix}=0-\delta_{III}\cdot R_{IIx}+\delta_{II}\cdot R_{IIIx}$$

Furthermore, the other coefficients will be altered as follows:

(N)

$$\Delta R'_{IIx}=\delta_{III}\cdot R_{Ix}+0-\delta_I\cdot R_{IIIx}$$
$$\Delta R'_{IIIx}=-\delta_{II}\cdot R_{Ix}+\delta_I\cdot R_{IIx}+0$$
$$\Delta R'_{Iy}=0-\delta_{III}\cdot R_{IIy}+\delta_{II}\cdot R_{IIIy}$$
$$\Delta R'_{IIy}=\delta_{III}\cdot R_{Iy}+0-\delta_I\cdot R_{IIIy}$$
$$\Delta R'_{IIIy}=-\delta_{II}\cdot R_{Iy}+\delta_I\cdot R_{IIy}+0$$
$$\Delta R'_{IZ}=0-\delta_{III}\cdot R_{IIZ}+\delta_{II}\cdot R_{IIIZ}$$
$$\Delta R'_{IIZ}=\delta_{III}\cdot R_{IZ}+0-\delta_I\cdot R_{IIIZ}$$
$$\Delta R'_{IIIZ}=-\delta_{II}\cdot R_{IZ}+\delta_I\cdot R_{IIZ}+0$$

By comparing Equations N with Equations K, it is apparent that the axes *x, y* and *z* have been redesignated as axes I, II and III, respectively, and vice versa. This is exactly what is physically intended when we rotate I, II and III with *x, y* and *z* fixed.

Figure 4:
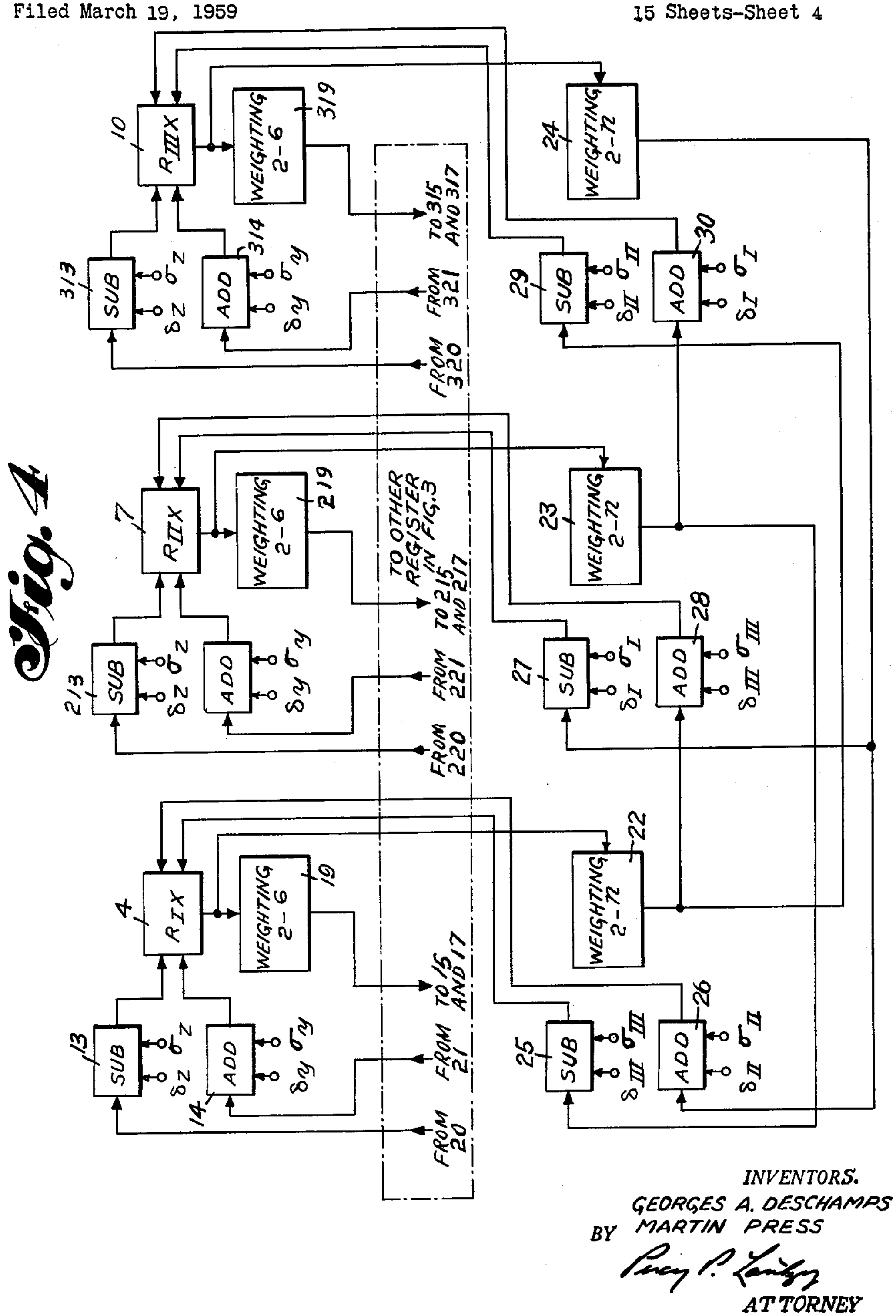
FIG. 4 is a block diagram showing the general method of altering stored numbers to account for rotations of the reference frame.

Turning next to FIG. 4 there is shown a method for altering the numbers $R_{Ix}$, $R_{IIx}$ and $R_{IIIx}$ stored in registers 4, 7 and 10 of FIG. 3, to account for rotations of the reference frame about axes I, II and III, as expressed in Equations N. Weighting devices 22, 23 and 24 are coupled to registers 4, 7 and 10, respectively, to read and weight numbers stored therein. The numbers are weighted by these devices depending on the value of incremental signals $\delta_I$, $\delta_{II}$ and $\delta_{III}$ having signs represented by signals $\sigma_I$, $\sigma_{II}$ and $\sigma_{III}$, respectively. These incremental signals are preferably pulses, each pulse representative of equal increments of rotation of the reference frame about one of its axes I, II or III. The weighted values of the numbers from devices 22, 23 and 24 are fed to add devices or subtract devices 25 to 30 which are controlled by $\delta_I$, $\delta_{II}$ and $\delta_{III}$ pulses and $\sigma_I$, $\sigma_{II}$ and $\sigma_{III}$ signals in the same manner as already described with reference to add and subtract devices 13 to 18 controlled by signals of gyroscope devices. The outputs from add and subtract devices 25 to 30 are applied, as shown, to registers 4, 7 and 10 thereby adding or subtracting weighted values of $R_{Ix}$, $R_{IIx}$ or $R_{IIIx}$.

The weighting of the numbers from registers 4, 7 and 10 by devices 22, 23 and 24 depends upon the incremental angle of rotation represented by each reference frame rotation pulse; just as the weighing by devices 19, 20 and 21 depends upon the incremental angle of rotation represented by each gyro pulse. For example, if each reference frame rotation pulse represents an angular increment of rotation of the reference frame about one of its axis of $2^{-10}$ radians, devices 22, 23 and 24 would weight numbers $R_{Ix}$, $R_{IIx}$ and $R_{IIIx}$ by effectively multiplying each of them by $2^{-10}$.

The system in FIG. 4 shows only three of the registers shown in FIG. 3 with means coupled thereto for altering numbers to account for reference frame rotations. Consequently, only three of the Equations N are computed by the system shown in FIG. 4. These are the equations for $\Delta R'_{Ix}$, $\Delta R'_{IIx}$ and $\Delta R'_{IIIx}$. The remaining of the Equations N can obviously be computed by similar circuits coupled to the other registers of FIG. 3.

The various functions indicated in FIGS. 3 and 4 and described above may be performed in many ways using, for example, static or dynamic logic circuitry. The systems shown in these figures have many redundancies in equipment, such as a multiplicity of adder-subtracters, sign control devices, weighting devices, and registers, etc., many of which can be eliminated in a more sophisticated arrangement. One form of such an arrangement is described in FIGS. 5*a*, 5*b* and 5*c* wherein is shown a rotatable matrix computer comprising dynamic logic circuits controlled by buffered body and reference frame rotation pulses and various timing pulses from an electronic clock. This computer performs the functions hereinabove described with reference to FIGS. 3 and 4 includes three magnetostrictive storage devices to store the nine coefficients $R_{ij}$ in serial binary form. The dynamic circuits shown are responsive to buffered $\delta_x$, $\delta_y$ and $\delta_z$ pulses from gyroscope devices fixed to the *x, y* and *z* axes of a body such as shown in FIG. 1 and buffered $\delta_I$, $\delta_{II}$ and $\delta_{III}$ pulses from sources at any convenient location. These pulses from the gyroscope devices 5 and sources are buffered by dynamic circuitry shown in FIGS. 6*a* and 6*b*. The buffered pulses control additions and subtractions from the nine coefficients $R_{ij}$ as prescribed by the nine Equations K and the nine Equations N. Before going on to a description of the other figures and in order to see the relationship of these figures to each other, reference is again made to FIG. 12 which shows in chart form the relation of FIGS. 3 and 4 to the other figures, which will next be discussed.

The operation of a typical one of the numerous dyamic logic circuits comprising the rotatable matrix computer shown in FIGS. 5*a*, 5*b* and 5*c* and buffers shown in FIGS. 6*a* and 6*b* can be understood with reference to the details of such a circuit shown in FIGS. 7*a*, 7*b* and 7*c*, while the operation of a typical one of the gyroscope devices shown in FIG. 1*a* may be understood with reference to the details of such a device shown in FIG. 8 and the operation of the electronic clock may be followed by reference to FIG. 9, which is a system diagram, and FIGS. 10*a* and 10*b*, which depict various clock output waveforms and matrix computer waveforms.

Referring next to FIG. 7*a*, there is shown a typical dynamic logic circuit 31 which is typical of those represented in FIGS. 5*a*, 5*b* and 5*c* having an assertive output $\alpha_{31}$ and a negative output $\eta_{31}$. The various functions of the matrix computer shown in FIGS. 5*a*, 5*b* and 5*c* and 6*a* and 6*b* are performed by dynamic circuitry, the principles of which are well known and described in some detail in an article by R. W. Brooks on page 147 of the March, 1957 issue of "Instruments and Automation." There is also some discussion of dynamic binary circuits on page 415 in "Pulse and Digital Circuits" by Millman and Taub, published by McGraw-Hill. The external inputs to circuit 31 are A', B', and $\overline{T}_n$, and the logic performed by this circuit is expressed by the equations for $\alpha_{31}$ and $\eta_{31}$ shown at FIG. 7*a*. The same dynamic logic circuit 31 is shown in detail in FIG. 7*b* comprising input "and" circuits 32 and 33, each of which produces a single pulse output in response to simultaneously receiving pulses from two different sources. The "and" circuit 32 is fed $\alpha_{31}$ and $\overline{T}_n$ pulses, while "and" circuit 33 is fed A' and B' pulses. The outputs of circuits 32 and 33 are coupled together and fed to a similar "and" circuit 34 which also is fed one microsecond clock pulses from the electronic clock described herein with reference to FIG. 9 so that said clock pulses appear at the output of circuit 34 when they are in coincidence with the output of circuits 32 and 33. The output of "and" circuit 34 is fed to amplifier 35 whose pulse output is fed to transformer 36 having two secondary windings 37 and 38 coupled together by battery 39, one terminal of which is grounded. The outputs from windings 37 and 38 are fed to delay circuits 40 and 41, respectively, serving to delay pulses from their respective coils to yield output pulses $\alpha_{31}$ and $\eta_{31}$ so that they are synchronized with the next clock pulse. A waveform diagram of $\alpha_{31}$ and $\eta_{31}$ is shown in FIG. 7*c* from which it may be seen that while $\alpha_{31}$ is at ground potential between pulses, $\eta_{31}$ is at battery 39 voltage and subsequently when $\alpha_{31}$ swings toward battery 39 voltage in response to a pulse output from amplifier 35, $\eta_{31}$ swings toward ground. In other words, an approximate ground potential output at terminal $\alpha_{31}$ indicates that the logic equation for $\alpha_{31}$ shown in FIG. 7*a* is not satisfied whereas battery 39 voltage output at terminal $\alpha_{31}$ indicates that the logic equation is satisfied. Oon the other hand, the converse of these conditions exists at terminal $\eta_{31}$.

Consider next the operation of a typical one of the gyroscope devices X, Y, or Z shown in FIGS. 1 and 6*b*, say for example device X which produces $\delta_x$ pulses and a $\sigma_x$ signal in response to rotations of body 1 about its *x* axis. Referring to FIG. 8, there are shown the details of device X comprising a single degree of freedom gyroscope system preferably fixed to body 1 of FIG. 1 so that a rotation of body 1 about its *x* axis causes the gyroscope housing 42*a* to precess on bearing 42*b* and 42*c* supporting axle 42*d* which is orientated in the *y* axis direction and preferably concentric with the *y* axis. The precession angle of the gyroscope is detected as a phase shift of a 1 kc. signal induced in rotor coil 42*e*, fixed to one end of axle 42*d*, by stator coil 42*f*. This phase shifted 1 kc. signal is fed from rotor coil 42*e* via brush 42*g* to amplifier 44 and in turn to phase comparing network 45 where it is phase compared with the signal from a 1 kc. oscillator 46 which also energizes coil 42*f*. The output of network 45 is a pulsating D.C. signal whose D.C. sign and magnitude are indicative of the phase difference between input signals. This output is filtered by 1 kc. filter 47 and fed to chopper 48 which is controlled by sampling pulse generator 49 generating 1 kc. chopper pulses in response to the output of 1 kc. oscillator 46. The chopped D.C. output signal from chopper 48 is then fed to each of similar reference voltage multivibrators 50 and 51 which are also fed D.C. signals from battery 52, multivibrator 50 being fed a positive voltage from battery 70 and multivibrator 51 being fed a negative voltage from battery 52. The design and operation of multivibrators 50 and 51 may be as described on page 343, volume 19 of Radiation Laboratory Series published by McGraw-Hill. These multivibrators each produce a signal pulse output upon receiving a pulse from chopper 48 which is, in the case of multivibrator 50, more positive than the positive battery voltage fed to multivibrator 50 or, in the case of multivibrator 51, more negative than the negative battery voltage fed to multivibrator 51. The output of multivibrator 50 energizes bistable flip-flop circuit 53*a*, and the output of multivibrator 51 energizes bistable flip-flop circuit 53*b*. Each of these flip-flop circuits, 53*a* and 53*b*, are reset simultaneously by a signal from standard pulse generator 54 via delay circuit 55. The outputs of one stage of flip-flop circuits 53*a* and 53*b* are coupled to and controlled by "and" gates 56*a* and 56*b* which gate pulses from standard pulse generator 54 and feed said gated pulses to one end or the other of torquing coil 57 which is inductively coupled to magnet 58 fixed to axle 40, thereby torquing said axle. Thus, the output of chopper 48 consisting of positive or negative pulses causes multivibrators 50 and 51 to energize flip-flop circuits 53*a* and 53*b*, respectively, when said pulses from chopper 48 exceed predetermined voltage values determined by battery 52, and when flip-flop circuits 53*a* and 53*b* are energized, gates 56*a* or 56*b* are opened allowing a signal pulse from standard pulse generator 54 to be applied to one side or the other of torquing coil 57 causing axle 42*d* to be torqued in such a direction as to oppose the tendency of gyroscope housing 37 to precess in response to a rotation of body 1 about the *x* axis. The outputs of "and" gates 56*a* and 56*b* are also fed to "or" gate circuit 59 whose output signal consists of $\delta_x$ pulses. The sign of the $\delta_x$ pulse is represented by the signal output $\sigma_x$ from one stage of bistable flip-flop circuit 60, which is also coupled to the outputs of "and" gates 56*a* and 56*b*. The $\delta_x$ pulses and $\sigma_x$ signal are applied to buffer devices such as shown in FIG. 6.

Referring next to FIGS. 9, 10*a* and 10*b*, there are shown a block diagram of the electronic clock and a waveform diagram of some of the pulses issuing therefrom and employed in the matrix computer. The clock shown in FIG. 9 is comprised of a 1 mc. oscillator 61 feeding a pulse generator 62 producing 1 μsec. spaced pulses which is the basic clock pulse, hereinafter referred to as $T_n$, where *n* is an integer from 1 to 96. These basic clock pulses are fed to all the dynamic logic circuits in the manner hereinabove described with reference to FIG. 7*b*. The output from pulse generator 62 is fed to closed ring counter 63 having forty-eight stages, the output of each stage being denoted by numbers 1 to 48 some of which are shown as output terminals from 63. Ring counter 63 may be similar to the device shown at the bottom of page 343 of Millman and Taub, "Pulse and Digital Circuits" published 1956 by McGraw-Hill, except that the ring counter employed in this invention must have many more stages than shown in the reference. The outputs from stages 1, 8, 16, 24, 32 and 40 of ring counter 63 are each fed via diodes 64 to single input bistable flip-flop circuit 65 so that one side, say for example, 65*a* of flip-flop circuit 65, produces an output signal in response to an output from stages 1, 16, and 32 of ring counter 63 and the other side of flip-flop circuit 65, say for example 65*b*, produces an output each time stages 8, 24 and 40 of ring counter 63 are caused to conduct. In the figure, flip-flop circuits are indicated "F, F" and the location of inputs indicate bistable or monostable. The outputs from 65*a* and 65*b* are fed to "and" circuits 66 and 67, respectively, via delay circuits 68 and 69, respectively. In the figure, delays are indicated "D" and the "and" gates are indicated "G." These "and" circuits, 66 and 67, serve to gate pulses from pulse generator 62 to yield the $T_w$ and $\overline{T}_w$ waveform pulses shown in the waveform diagram FIG. 10*a* and discussed with reference to the matrix computer shown in FIGS. 5*a*, 5*b* and 5*c*. Delay circuits 68 and 69 serve to delay the openings of "and" gates 66 and 67 in response to signals from stages 1, 16 and 32 and signals from stages 8, 24 and 40, respectively, so that gates 66 and 67 open one μsec. after the signals from their associated stages of counter 63. The output of stage 48 of ring counter 63 is fed back to stage 1 of ring counter 63 to condition stage 1 so that the next pulse from pulse generator 62 will begin another count. Stage 1 of counter 63 is applied to single input bistable flip-flop circuit 70 having stages 70*a* and 70*b*. These stages alternately produce outputs during each counting cycle of counter 63. For example, stage 70*a* produces an output when counter 63 counts from 1 to 48 and stage 70*b* produces an output during the next cycle of counter 63 when it counts from 49 to 96. The output from stage 70*b* controls "and" gates 71 to 74 while the output from stage 70*a* controls "and" gates 75 and 76. Gates 71 to 74 serve to gate the outputs from stages 1, 16, 32 and 48 of counter 63 which are fed to these gates via suitable delay circuits 77 to 80, respectively. Consequently, the outputs from gates 71 to 74 are pulses in time coincidence with the 49th, the 64th, the 80th and the 96th clock pulse from generator 62. The outputs from gates 71 to 74 control "and" gates 81 to 84 which are fed clock pulses from pulse generator 62 and yield the clock pulses denoted $T_{49}$, $T_{64}$, $T_{80}$ and $T_{96}$.

In a similar manner gates 75 and 76 controlled by the output of stage 70*a* of bistable flip-flop circuit 70 serve to gate the outputs from stages 1 and 48 of counter 63 fed to these gates via delay circuits 77 and 80. Consequently, the outputs from gates 75 and 76 are in time coincidence with the first and the forty eighth clock pulse. These outputs are applied to "and" gates 85 and 86, respectively which serve to gate the first and forty eighth pulses from pulse generator 62 to yield clock pulses $T_1$ and $T_{48}$, respectively.

In order to generate certain gating signals required in the matrix computers, such as gating signals $T_a$, $T_b$, $T_c$ and $T_d$, a plurality of double input bistable flip-flop circuits are provided. These flip-flop circuits are denoted 87, 88, 89 and 90 in FIG. 9. The gating intervals are shown in waveform diagrams in FIG. 10*b* on which the beginning and end of each gating signal is denoted in terms of numbered clock pulses. Gating signal $T_a$ initiates at clock pulse $T_{96}$ and commences to the following $T_{49}$, gating signal $T_b$ commences at $T_{48}$ and continues to the following $T_{64}$, gating signal, $T_c$ commences at $T_{64}$ and continues to the following $T_{80}$ and gating signal $T_d$ commences at $T_{80}$ and continues to the following $T_{96}$. In order to produce these gating signals over the described intervals, stages 87*a*, 88*a*, 89*a* and 90*a* of flip-flop circuits 87, 88, 89 and 90 are coupled to the outputs of gates 84, 86, 82 and 83 while stages 87*b*, 88*b*, 89*b* and 90*b* are coupled to the outputs of gates 81, 82, 83 and 84. As a result, stages 87*a*, 88*a*, 89*a* and 90*a* conduct during the intervals $T_a$, $T_b$, $T_c$ and$T_d$.

Turning next to FIGS. 6*a* and 6*b* there are shown two typical buffering devices. One of these buffering circuits serves to buffer $\delta_j$ pulses and $\sigma_j$ signals representing increments of rotations of body 1 about its axis such as produced by a gyroscope device shown in FIG. 8. The other buffering circuit is for buffering pulses $\delta_i$ and signals $\sigma_i$ representing increments of rotation of the reference frame about one of its axis. The source of these $\delta_i$ pulses and $\sigma_i$ signals are not specifically defined in this invention. However, it is evident that any suitable controlled source for producing pulses each representing equal increments of rotation of the reference frame about one of its axis and for producing a signal indicative of the sign of said increment of rotation, may be satisfactorily employed as this source.

A typical $\delta_j$ pulse from a gyroscopic device such as devices X, Y or Z is shown in waveform diagram 10*b*. For example, as shown in the diagram, a $\delta_j$ pulse occurring during the interval of set one, while the clock is counting between 1 and 48, is buffered to produce 48 spaced pulses during the interval of the next set during which the clock counts from 1 to 48, its buffer circuits would produce 48 clock pulses during the second set shown in FIG. 10*b*. If the $\delta_j$ pulse represents a negative rotation of the body about one of its axes, then the $\delta_j$ signal is buffered to also produce 48 clock pulses during the following set in which said clock counts from 1 to 48. The $\delta_i$ pulses and $\sigma_i$ signals representative of increments of rotation of the reference frame are buffered in much the same manner. For example, if as shown in the figure a $\delta_i$ pulse should occur during said set one, that pulse would be buffered to produce 48 clock pulses during the next set in which the clock counts from 49 to 96. If that $\delta_i$ pulse represents a negative increment of rotation of the reference frame, the $\sigma_i$ signal is buffered to also produce 48 clock pulses during the next set in which the clock counts from 49 to 96. Consequently, the buffered $\delta_j$ pulses consisting of 48 clock pulses are in coincidence with the interval of $T_a$ and the buffered $\delta_i$ pulses consisting of 48 clock pulses are coincident with intervals $T_b$, $T_c$ and $T_d$.

Turning next to FIG. 6*b* there is shown a typical device for buffering a $\delta_j$ pulse and $\sigma_j$ signal from a gyroscope device and in FIG. 6*a* a typical circuit for buffering a $\delta_i$ pulse and $\sigma_i$ signal from a suitable source representing reference frame rotations. As shown in FIG. 6*b*, $\delta_j$ pulses and $\sigma_j$ signals from a gyro device such as devices X, Y, or Z are applied to logic circuits 91 and 92. In addition, $\overline{T}_{49}$ pulses are applied to circuit 91 and $T_{48}$ and $\overline{T}_{96}$ pulses are applied to circuit 92. Also the output from circuit 91 is applied to circuit 92 and the outputs from each of these circuits are fed back. Consequently, the logic of these circuits are each expressed by Equations P and Q below.

(P) $$\alpha_{91}=\delta_j v(\overline{T}_{49}\cdot\alpha_{91})$$

(Q) $$\alpha_{92}=(\sigma_j\cdot\alpha_{91}\cdot T_{48})v(\overline{T}_{96}\cdot\alpha_{92})$$

The assertive output from circuit 92 is denoted $\sigma_j$ and the negative circuit from 92 is denoted $\overline{\sigma}_j$. The assertive output from circuit 91 is applied to logic circuit 93 to which is also applied $T_{48}$ pulses, $\overline{T}_{96}$ pulses and the assertive output from circuit 93. Consequently, the logic of Equation 93 is expressed by Equation R below.

(R) $$\alpha_{93}=(\alpha_{91}\cdot T_{48})v(\delta_j\cdot T_{48})v(\alpha_{93}\cdot\overline{T}_{96})$$

and consists of 48 pulses occurring in the set following the occurrence of a $\delta_j$ pulse from the gyro device during which the clock counts from 1 to 48.

Turning to FIG. 6*a* there is shown a buffer circuit for buffering the $\delta_i$ pulses and the $\sigma_i$ signals representative of reference frame rotations, there is shown a typical source of such pulses and signals, denoted 94, which can be a pulse generator generating signals of the same form as the output of the gyro device X, Y or Z denoting incremental changes in the reference frame position to rotate the reference frame position to a new reference frame coordinate system as may be desired whose output is fed to logic circuits 95 and 96. Circuit 95 is also fed $\overline{T}_1$ pulses and its own assertive output, while circuit 96 is fed $T_{96}$ pulses, $\overline{T}_{48}$ pulses, the assertive output from circuit 95 as well as its own assertive output. As a result the assertive output from circuit 96 consists of buffer $\sigma_i$ pulses while the negative output from circuit 96 consists of $\overline{\sigma}$ pulses. The logic performed by circuits 95 and 96 is as expressed by logic Equations S and T below.

(S) $$\alpha_{95}=(\delta_i)v(\overline{T}_1\cdot\alpha_{95})$$

(T) $$\alpha_{96}=(\sigma_i\cdot\alpha_{95}\cdot T_{96})v(T_{48}\cdot\alpha_{96})$$

The assertive output from circuit 95 is applied to circuit 97 as well as $T_{95}$ pulses, $\overline{T}_{48}$ pulses and the assertive output from circuit 97. Consequently, the assertive output from circuit 97 consists of buffered $\delta_i$ pulses and the logic performed by circuit 97 consists is expressed by logic Equation U below.

(U) $$\alpha_{97}=(\alpha_{95}\cdot T_{96})v(\delta_i\cdot T_{96})v(\alpha_{97}\cdot\overline{T}_{48})$$

Turning next to FIGS. 5*a*, 5*b* and 5*c*, there is shown a matrix computer for storing the nine numbers representative of cosines of the angles formed by body axis with the reference frame axis having appropriate gating and adding means coupled thereto for altering said numbers as dictated by the rotations of said body and the rotations of said reference frame.

Dynamic storage devices 98, 99 and 100 are identical in construction and operation, each serving to store three different ones of the nine coefficients $R_{ij}$ expressed in the equations. Since these storage devices are identical in construction and operation, the details of structure and operation of device 98 only will be described herein. Device 98 is comprised of a magnetostrictive delay line 101 which serves to delay each pulse input from coil 102, inductively coupled to one end thereof, 48 microseconds before it is detected at coil 103, which is inductively coupled to the other end, and fed to amplifier 104. Since the dynamic system herein described runs at one megacycle as established by the electronic clock, magnetostrictive delay line 101 is capable of storing 48 bits of information at any particular instant, which in this embodiment describe three different numbers each of 16 binary bits. Three such numbers, each comprised of 16 binary bits are shown in time relationship and denoted inputs to amplifier 104 in the waveform diagrams of FIG. 10*a* wherein it is seen that the first or most insignificant binary bit of number $R_{Ix}$ in alternate sets of numbers coincides in time with timing pulse $T_1$. Pickup coil 105 is also inductively coupled to magnetostrictive delay line 101 at such a point that it detects a given pulse introduced by coil 102, thirty two microseconds later or eight microseconds before that same pulse is detected by coil 103 and feeds this pulse to amplifier 106. The output of amplifier 106 is fed to dynamic fill-in circuit 107 which serves to blank out the least significant first 8 binary bits of each of the three numbers dynamically stored in magnetostrictive delay line 101 by employing what are herein referred to as fill-in pulses $T_w$ and $\overline{T}_w$ from the electronic clock. The logic of circuit 107 may be expressed by the following logic equation:

(V) $$\alpha_{107}=\Delta R_{1x}=(R_{1x}\cdot T_w)v(\alpha_{107}\cdot\overline{T}_w)$$

As seen in Equation V above, the assertion output from circuit 107 is equivalent to $\Delta R_{1x}$ which is an increment of 16 bit binary number $R_{1x}$ stored in magnetostrictive device 101 and is shown in waveform in FIG. 10*a* where it is denoted $\alpha_{107}$. As expressed by logic Equation V above, the output $\alpha_{107}$ consists of a pulse upon the simultaneous arrival at the input to circuit 107 of a $T_w$ pulse and one binary bit pulse from number $R_{1x}$ or upon the simultaneous arrival of an $\alpha_{107}$ pulse and a $\overline{T}_w$ pulse at the input to circuit 107. Thus, the effect of circuit 107 is to insert pulses in place of the first 8 least significant binary bits of each of the three sequential numbers $R_{Ix}$, $R_{IIx}$ and $R_{IIIx}$ which are stored serially in magnetostrictive delay line 101 in the manner hereinabove described. Meanwhile, magnetostrictive storage devices 99 and 100 with fill-in circuits 108 and 109, respectively, function in the same manner as magnetostrictive storage device 98 and circuit 107. Circuits 108 and 109 perform the same functions in computing the factors $\Delta R_{1y}$ and $\Delta R_{1z}$ as does circuit 107 to compute the factors $\Delta R_{1x}$.

One of the purposes of logic circuits 110 and 111 is to gate the outputs from circuits 108 and 109 in response to buffered $\delta_y$ and $\delta_z$ pulses from circuits such as circuit 93, the buffered $\overline{\sigma}_y$ and $\sigma_y$ and $\sigma_z$ and $\overline{\sigma}_z$ signals from circuits such as circuit 92 and clock interval pulse $T_a$, so as to compute the factors $\Delta R_{Ix}$, $\Delta R_{IIx}$ and $\Delta R_{IIIx}$ associated with device 87 and expressed in Equations K. For example, assume that at a given instant a 16-bit word $R_{Ix}$ is being fed through to circuit 107 in serial form, the least significant bit first, while at the same given instant, numbers $R_{Iy}$ and $R_{Iz}$ are being fed to circuits 108 and 109, respectively. The first eight least significant bits of each of these numbers are removed in circuits 107, 108 and 109 and pulses and substituted therefor. Thus, the logic equations at said instant which are performed by circuits 107, 108 and 109 are expressed by Equations W as follows:

(W)
$$\alpha_{107}=\Delta R_{Ix}=(R_{Ix}\cdot T_w)v(\alpha_{107}\cdot\overline{T}_w)$$
$$\alpha_{108}=\Delta R_{Iy}=(R_{Iy}\cdot T_w)v(\alpha_{108}\cdot\overline{T}_w)$$
$$\alpha_{109}=\Delta R_{Iz}=(R_{Iz}\cdot T_w)v(\alpha_{109}\cdot\overline{T}_w)$$

For this purpose of circuits 110 and 111 feed binary numbers $\Delta R_{Iz}$ and $\Delta R_{IIz}$, respectively, to dynamic serial adder circuits 112 and 113, via suitable delay circuits 114 and 115. The function of dynamic serial adder circuits 112 annd 113, at said given instant, is to add or subtract $\Delta R_{Iz}$ and $\Delta R_{Iy}$ to $R_{Ix}$ upon the occurrence of $\delta_y$ and $\delta_z$ pulses, thereby performing the operation described by one of Equations K and one of Equations M. As stated hereinabove, coil 105 detects a pulse binary bit eight microseconds before coil 103 detects the same bit, and since the numbers stored in the magnetostrictive device 101 in serial form one after the other are detected by these coils, the least significant binary bit first, the number detected by coil 105, say for example $\Delta R_{Ix}$, will actually be $2^{-8}$ times the number $R_{Ix}$ detected by coil 103. Likewise and in the same manner, the binary serial numbers fed to circuits 108 and 109, namely, $R_{Iy}$ and $R_{Iz}$ will be reduced by a factor $2^{-8}$. The purpose of delay circuits 114 and 115 is to delay output signals from circuits 110 and 111, respectively, so that the binary serial numbers fed from them to adders 112 and 113, $\Delta R_{Iz}$ and $\Delta R_{Iy}$, respectively, are shifted six microseconds with respect to the number $R_{Ix}$ to which they are added or subtracted. Thus, delay circuits 114 and 115 add whatever delay is necessary along with the inherent delays in circuits 107, 108 and 110 and 111 to cause the six microsecond shift so that the significance of each $\delta$ pulse of $2^{-6}$ radians is maintained. The logic performed by circuits 110 and 111 during the clock interval $T_a$ is expressed by the following two logic equations:

(A′) $$\alpha_{110}=(\delta_y\cdot\sigma_y\cdot\overline{\Delta}R_{Iz}\cdot T_a)v(\delta_y\cdot\overline{\sigma}_y\cdot\Delta R_{Iz}\cdot T_a)$$

(B′) $$\alpha_{111}=(\delta_z\cdot\sigma_z\cdot\overline{\Delta}R_{Iy}\cdot T_a)v(\delta_z\cdot\sigma_z\cdot\Delta R_{Iy}\cdot T_a)$$

As can be seen from logic Equation A′ above, an assertive output from circuit 110, indicative of $\overline{\Delta}R_{Iz}$ occurs when, simultaneously, a buffered $\delta_x$ pulse from circuit 93, a buffered $\sigma_x$ signal from circuit 92, a $T_a$ interval pulse and $\overline{\Delta}R_{Iz}$ pulses from circuit 109 arrive at the input of circuit 110. This assertive output, indicative of $\overline{\Delta}R_{Iz}$ and its negation are both fed to serial adder 112, thereby subtracting the number $\Delta R_{Iz}$ from the number $R_{Ix}$ which is also fed to adder 112 from amplifier 104. If the buffered $\sigma_x$ signal to circuit 110 is not a ground signal, as when its associated $\delta_x$ pulse indicates a positive increment of rotation of body 1, then the complement of serial binary number $\overline{\Delta}R_{Iz}$ or $\Delta R_{Iz}$ will be added to the number $R_{Ix}$ by the action of adder 112. During the interval $T_a$, circuit 111 operates in a manner similar to circuit 110 to condition number $\Delta R_{Iy}$ in response to buffered $\delta_z$ pulses and their signs as represented by buffered $\sigma_z$ signals, so that the number $\Delta R_{Iy}$ is added or subtracted to the output of adder 112 by the action of adder 113 to thereby complete computation of the first one of Equations K and the first one of Equations M.

Binary serial adders 112 and 113 associated with magnetostrictive storage device 98, as well as the other adders shown in FIGS. 5*b* and 5*c* associated with storage devices 99 and 100, may operate as any of the high speed serial adders known to the art such as, for example, described on page 461 of the March 1957, edition of "Instruments and Automation" published by the Instruments Publishing Company of Pontiac, Illinois.

Pickup coils 116 and 117 are inductively coupled to magnetostrictive delay line 101 at points therealong to detect a given pulse introduced by coil 102, 24 and 8 microseconds later, respectively. Consequently, at the interval $T_d$, coil 105 detects $\Delta R'_{IIIx}$ and the affirmative and negative outputs from dynamic fill-in circuit 107 are $\Delta R'_{IIIx}$ and $\Delta\overline{R}'_{IIIx}$. At the same interval $T_d$, coils 116 and 117 detect $\Delta R'_{IIx}$ and $\Delta R'_{Ix}$, respectively. The pulses detected by coils 116 and 117 are amplified by amplifiers 118 and 119 and applied to dynamic fill-in circuits 120 and 121, respectively. Fill-in circuits 120 and 121 operate in the same manner as described above with reference to dynamic fill-in circuit 107. At the interval $T_d$, the affirmative output from circuit 120 is $\Delta R'_{IIx}$ and its negative output is is $\Delta\overline{R}'_{IIx}$ while the affirmative output from circuit 121 is $\Delta R'_{Ix}$ and its negative output for $\Delta'\overline{R}'_{Ix}$. During the intervals $T_b$ and $T_c$, the outputs from circuits 107, 120 and 121 are of course different. For example, during the interval $T_b$ coil 105 detects $\Delta R_{Ix}$ while coils 116 and 117 detect $\Delta R'_{IIIx}$ and $\Delta R'_{IIx}$, respectively.

Similar dynamic fill-in circuits with associated amplifiers and pick-up coils are coupled to the number storage 99 and 100 in FIG. 5*b* and 5*c*, respectively. Coupled to device 99, are dynamic fill-in circuits 122 and 123 which, during the interval $T_d$ produce outputs $\Delta R'_{IIy}$ and $\Delta\overline{R}'_{IIy}$ and $\Delta R'_{Iy}$, $\Delta\overline{R}_{Iy}$, respectively. Coupled to device 100 are dynamic fill-in circuits 124 and 125 which during the interval $T_d$ produce otuputs $\Delta R_{IIz}$, $\Delta\overline{R}'_{IIz}$ and $\Delta R'_{Iz}$, $\Delta\overline{R}'_{Iz}$, respectively.

Another purpose of logic circuits 110 and 111 is to gate the outputs from dynamic fill-in circuits 107, 120 and 121 in response to buffered $\delta_I$, $\delta_{II}$ and $\delta_{III}$ pulses, buffered $\sigma_I$, $\sigma_{II}$ and $\sigma_{III}$ signals and clock interval pulses $T_b$, $T_c$ and $T_d$. These gated outputs are applied to binary adders to alter the stored numbers to account for rotations of the reference frame. As shown in FIG. 5*a*, during the interval $T_d$ when number $R_{IIIx}$ is detected by coil 103 and applied to adder 112, number $\Delta R'_{Ix}$ gated by buffered $\delta_{II}$ pulses is also fed to adder 112. During the same interval in logic circuit 111, $\Delta R'_{IIx}$ gated by buffered $\delta_I$ pulses is fed to adder 113. As a result $\Delta R'_{Ix}$, $\Delta R'_{IIx}$ are added to the number $R_{IIIx}$ to account for rotations of the reference frame about axes I and II. In the same manner, the outputs from circuits 107, 120 and 121 are gated by logic circuits 110 and 111, in accordance with bugered $\delta_I$ pulses during the intervals $T_b$, $T_c$ or $T_d$ to alter the numbers $R_{Ix}$, $R_{IIx}$ and $R_{IIIx}$, thereby accounting for rotations of the reference frame about its axis. By this action three of Equations N are computed. The systems shown in FIG. 5*b* and 5*c* each account for three other of the Equations N in a similar manner which may be readily understood by examination of these figures in view of the above description with reference to FIG. 5*a*.

Turning next to FIG. 11, there is shown one utilization of the matrix computer described above with reference to FIGS. 5*a*, 5*b* and 5*c*. The three magnetostrictive storage devices 98, 99 and 100 described hereinabove with reference to FIGS. 5*a*, 5*b* and 5*c* are shown. The output of a single one of these, say for example 98 represented by the output of its associated amplifier 104, is shown in FIG. 11 feeding number separating gating circuit 126 whose output consists of three serial binary numbers $R_{Ix}$, $R_{IIx}$ and $R_{IIIx}$ transmitted via lines 127, 128 and 129, respectively to identical serial shift registers 130, 131 and 132, respectively. Gating circuit 126 gates the output from amplifier 104 in response to signals from stages 1, 16 and 32 of ring counter 63 so that serial numbers $R_{Ix}$, $R_{IIx}$ and $R_{IIIx}$ are stored in serial form in registers 130, 131 and 132, respectively, in that time sequence. The output of each of the registers consisting of 16 parallel signals each carried by a different line, are applied to parallel binary registers 133, 134 and 135, respectively, via "and" gates 136, 137 and 138, respectively. Each of "and" gates 136, 137 and 138 is comprised of 16 parallel "and" gates all of which are controlled simultaneously by the same signal. The signal controlling 16 "and" gates 136 is derived from the first stage of ring counter 63 shown in FIG. 9, while the signals controlling 16 "and" gates 137 and 138 are derived from stages 16 and 32, respectively, of counter 63. Thus, "and" gates 136, "and" gates 137 and "and" gates 138 open sequentially in that order when complete 16 bit serially binary numbers are registered in shift registers 130, 131 and 132, respectively.

The output of each of parallel registers 133, 134 and 135 consists of 16 lines, each line transmitting one binary bit and energized by the same voltage to represent a binary bit. Each one of the 16 line outputs from each parallel register is fed to a resistor, the value of said resistor being weighted in accordance with the significance of the binary bit of information feeding it. Thus, each parallel register feeds 16 weighted resistors which form the output network to a summing amplifier so that the output of said summing amplifier is an analog representation of the number stored in its associated parallel register. Accordingly, parallel registers 133, 134 and 135 feed weighted resistors 139, 140 and 141 which in turn form the input networks for summing amplifiers 142, 143 and 144, respectively.

The outputs of summing amplifiers 142, 143 and 144 are fed to analog multiplier 147, while amplifiers 143 and 144 feed similar multipliers associated with $V_{II}$ and $V_{III}$ meters which are not shown. Integrating accelerometers 148, 149 and 150, which are located in body 1 so as to yield signals indicative of the velocity of body 1 in the direction of the *x*, *y* and *z* axes, respectively, also feed signals to analog multipliers 145, 146 and 147, respectively, the latter two receiving $R_{Iy}$ and $R_{Iz}$ analog signals from systems similar to that shown in FIG. 11. Thus, the purpose of these analog multipliers is to weight the velocities of body 1, along its *x*, *y* and *z* axes, by multiplying each of said velocities by the register number representing the cosine of the angle between its associated axis, *x*, *y* or *z*, and reference frame axis I, yielding three products indicative of the projections of said velocities on the I axis. These products may then be summed to yield the velocity of body 1 in the direction of reference frame axis I. Accordingly, the outputs from analog multipliers 145, 146 and 147 are fed to summing amplifier 151 whose output denoted $V_I$ is indicative of the velocity of body 1 in the direction of reference frame axis I and is indicated on meter 152. The output of amplifier 151 is also fed to integrator 152 whose output which is indicative of distance traveled by body 1 in the direction of reference frame axis I, denoted $S_I$, is applied to meter 153 which indicates said distance.

Each of serial storage devices 99, 100 feed into identical systems as does device 98 to provide an indication of the velocity and displacement of body 1 in the directions of rotatable reference frame axes II and III, respectively, on similar velocity, V, and displacement, S, meters. Thus, an operator observing said meters may establish the position of body 1 in the inertial reference frame and this reference frame may be rotated in time and as body 1 moves to new positions. Obviously, velocities of a body along the axes of an inertial reference frame which may be rotated as desired are of utility to navigate said body in a controlled frame of reference, such as, for example, the earth frame of reference with axes North, East and vertical.

While we have described above the principles of our invention in connection with specific apparatus, it is to be clearly understood that this description is made only by way of example and not as a limitation to the scope of our invention as set forth in the objects thereof and in the accompanying claims.

We claim:

1. A system for providing information representing the angles formed by the axes of the body with the axes of a reference frame comprising a body, means coupled to said body for sensing rotations of said body about predetermined body axes and means coupled to said sensing means for producing signals representative of said rotations, a plurality of storage means responsive to said produced signals for storing a plurality of signals representative of numbers indicating the angular relationship of each of the body axes to each axis of the reference frame, with each number indicating a separate one of these angles, computer means coupled to said signal producing means and responsive to said produced signals for using a weighted value of the numbers in certain of said storage means to alter the numbers in others of said storage means in accordance with rotations of said body so that said numbers continually indicate said angular relationships, a source of separate signals representing changes in the attitude of said reference frame, and means coupled to said plurality of storage means and under control of said separate signals for altering said numbers in certain of said storage devices in proportion to the numbers in other of said storage means to change the attitude of said reference frame and to continually provide stored signals representing numbers in said storage means indicative of the angular relationship of each of said body axes to each of the axes of the immediate reference frame.

2. A system for providing information representing the angles formed by the axes of a body with the axes of a reference frame comprising a body, means coupled to said body for sensing rotations of said body about predetermined body axes and means coupled to said sensing means for producing signals representative of said rotations, a plurality of storage means responsive to said produced signals for storing a plurality of signals representative of the angular relationship of each of the body axes to each axis of the reference frame, with each stored signal indicating a separate one of these angles, computer means coupled to said signal producing means and responsive to said produced signals for applying a weighted value of the stored signals in certain of said storage means to others of said storage means in accordance with rotations of said body so that said stored signals continually indicate said angular relationships, a source of separate signals repreesnting changes in the attitude of said reference frame, and means coupled to said plurality of storage means and under control of said sepaarte signals for altering said stored signals in certain of said storage devices in proportion to the stored signals in other of said storage means to change the attitude of said reference frame and to continually provide stored signals in said storage means representative of the angular relationship of each of said body axes to each of the axes of the immediate reference frame.

3. A system for providing information representing the angles formed by the axes of a body with the axes of a reference frame comprising a body, means coupled to said body for sensing rotations of said body about predetermined body axes and means coupled to said sensing means for producing signals representative of said rotations, and storage means responsive to said produced signals for storing a plurality of signals representative of numbers indicating the angular relationship of each of the body axes to each axis of the reference frame with each number representing a separate one of these angles, computer means coupled to said signal producing means and responsive to said produced signals for applying a weighted value of certain of said numbers to alter others of said numbers in accordance with rotations of said body so that said numbers continually indicate said angular relationships, a source of separate signals representing changes in the attitude of said reference frame, and means coupled to said storage means and under control of said separate signals for altering certain of said numbers in proportion to other of said numbers to change the attitude of said reference frame and to continually provide stored signals representing numbers in said storage means indicative of the angular relationship of each of the body axes to each of the axes of the immediate reference frame.

4. A system for providing information representing the attitude of a body relative to a rotatable reference frame comprising a body, means coupled to said body for sensing rotations of said body and means coupled to said sensing means for producing signals in response to said rotation, a plurality of storage means responsive to said produced signals for storing signals representative of the attitude of said body with respect to said reference frame, computer means coupled to said signal producing means and responsive to said produced signals for coupling certain of said storage means to other of said storage means in accordance with rotations of said body, to theerby continually provide stored signals in said storage means representative of the attitude of said body with respect to said reference frame, a separate source of signals representing rotations of said reference frame, and means coupled to said plurality of storage means and under control of said separate signals for altering said stored signals in accordance with rotations of said reference frame.

5. A system for providing information representing the angles formed by the axes of a body with the axes of an immediate reference frame comprising a body, means coupled to said body for sensing rotations of said body about predetermined body axes and means coupled to said sensing means for producing signals representative of said rotations, storage means responsive to said produced signals for storing a plurality of signals representative of numbers indicating the angular relationship of each of the body axes to each axis of the immediate reference frame, with each number indicating a separate one of these angles, computer means coupled to said signal producing means and responsive to said produced signals for applying a weighted value of certain of the numbers to alter other of the numbers in accordance with rotations of said body so that said numbers continually indicate the angular relationships between the body axes and the axes of the immediate reference frame, a plurality of sources of separate pulse signals, each pulse from each one source representing equal increments of rotation of said first reference frame about a corresponding one of said reference frame axes, means for weighting each of the stored numbers, and gating means under control of said pulse signals for coupling the output of said weighting means to said storage means for controlling each of said stored numbers in accordance with said weighted numbers to thereby continually provide stored signals representing numbers in said storage means indicative of the angular relationship of each of the body axes to each of the axes of the immediate reference frame.

6. A system for providing information representing the angles formed by the axes of a body with the axes of a reference frame comprising a body, means coupled to said body for sensing rotations of said body about predetermined body axes and means coupled to said sensing means for producing signals representative of said rotations, storage means responsive to said produced signals for storing a plurality of signals representative of numbers indicating the angular relationship of the body axes to the reference frame axes, computer means coupled to said signal producing means and responsive to said produced signals for altering said numbers in accordance with rotations of said body so that said stored numbers continually indicate said angular relationships, and means for altering said numbers to account for rotations of said reference frame including a source of separate signals representing increments of rotation of said reference frame about said reference frame axes, means for weighting each of said stored numbers in proportion to said increments of rotation, means for adding to and subtracting from said stored numbers and gating means under control of said separate signals for applying predetermined weighted numbers to said adding and subtracting means whereby certain of the stored numbers are arithmetically operated on by certain of said weighted numbers so that the stored numbers continually indicate the angular relationship of each of said body axes to each of the axes of the immediate reference frame.

7. A system for computing and storing numbers representing the cosines of angles between the orthogonal axes of a body and the orthogonal axes of a reference frame comprising a body, means coupled to said body for sensing rotations of said body about predetermined axes and means coupled to said sensing means for producing signals representative of said rotations, storage means responsive to said produced signals for storing a plurality of signals representative of numbers indicating the angular relationship of the body axes to the reference frame axes, computer means coupled to said signal producing means and responsive to said produced signals for altering said numbers in accordance with rotations of said body so that said stored numbers continually indicate said cosines and means for altering said numbers to account for rotations of said reference frame including a source of separate signals representing increments of rotation of said reference frame about each of said reference frame axes, means for weighting each of said stored numbers in proportion to said increments of rotation, means for adding to, and subtracting from said stored numbers and gating means under control of said separate signals for applying predetermined weighted values of said numbers to said adding and subtracting means whereby a weighted number representing the cosine of the angle between a given body axis and a given reference frame axis is combined with the stored number representing the cosine of the angle between the same given body axis and another reference frame axis when a signal representing an increment of rotation of said reference frame about a third reference frame axis occurs.

8. A system for providing information representing the attitude of a body with respect to the three axes of a reference frame including a body, a plurality of rotation-sensitive devices for sensing rotations of said body about each of three predetermined body axes coupled to said body, means responsive to the output of said sensing means for producing and for storing nine signals each representing a number, each number representing a function of a different angle between one of said body axes and one of said reference frame axes, computer means coupled to said signal producing means and responsive to said produced signals for altering said numbers in accordance with rotations of said body so that said stored numbers continually indicate said angles, means for altering said numbers to account for rotations of said reference frame about said reference frame axes comprising a source of separate signals representing increments of rotation of said reference frame about each of said reference frame axes, means coupled to said storage means for weighting each of said nine numbers, adding and subtracting means coupled to said storage means for adding and subtracting to each of said nine numbers, and gating means under control of said separate signals for coupling said weighting means to said adding and subtracting means whereby weighted values of predetermined ones of said nine numbers are algebraically combined with others of said nine numbers.

9. A system as in claim 8, in which each of said stored numbers represents the cosine of only one and a different one of the separate angles formed by different combinations of body axes with reference frame axes, all the numbers together representing each of the angles formed by all the combinations of said body axes with each of the reference frame axes.

10. A system as in claim 8 wherein said storage means includes a plurality of serial-binary number storage means, each storing three different numbers, each representing the cosine of a different angle between one of said body axes and different ones of said reference frame axes.

11. A system according to claim 8 wherein said separate signals comprise pulses representative of equal increments of rotation of said reference frame about one of said reference frame axes and other signals representative of the sign of said reference frame rotation.

References Cited by the Examiner

UNITED STATES PATENTS

| | | | |
|---|---|---|---|
| 2,835,131 | 5/1958 | Vacquier et al. | |
| 2,945,643 | 7/1960 | Slater | 244—14 |

OTHER REFERENCES

"Inertial Guidance for Rocket-Propelled Missiles": by William T. Russel, Jet Propulsion Magazine, January 1958, vol 28, No. 1, A publication of the American Rocket Society, New York, N. Y. pp. 17–24 incl.

BENJAMIN A. BORCHELT, *Primary Examiner.*

ARTHUR M. HORTON, SAMUEL BOYD, *Examiners.*

R. F. STAHL, *Assistant Examiner.*